United States Patent
Shirai et al.

(10) Patent No.: US 12,361,632 B2
(45) Date of Patent: Jul. 15, 2025

(54) INFORMATION PROCESSING SYSTEM, INFORMATION PROCESSING METHOD, AND INFORMATION PROCESSING PROGRAM

(71) Applicant: GREE, INC., Tokyo (JP)

(72) Inventors: Akihiko Shirai, Kanagawa (JP); Yusuke Yamazaki, Tokyo (JP)

(73) Assignee: GREE, INC., Tokyo (JP)

( * ) Notice: Subject to any disclaimer, the term of this patent is extended or adjusted under 35 U.S.C. 154(b) by 153 days.

(21) Appl. No.: 17/990,414

(22) Filed: Nov. 18, 2022

(65) Prior Publication Data

US 2023/0162433 A1    May 25, 2023

(30) Foreign Application Priority Data

Nov. 19, 2021 (JP) ................................. 2021-188351
Dec. 23, 2021 (JP) ................................. 2021-209081

(51) Int. Cl.
*G06T 15/20*    (2011.01)
*G06T 7/73*    (2017.01)

(52) U.S. Cl.
CPC ............ *G06T 15/20* (2013.01); *G06T 7/75* (2017.01)

(58) Field of Classification Search
CPC .... G06T 7/70; G06T 7/73; G06T 7/74; G06T 7/75; G06T 15/20; G06T 19/006
See application file for complete search history.

(56) References Cited

U.S. PATENT DOCUMENTS 6,853,935 B2 * 2/2005 Satoh ..................... A63F 13/00
702/94
10,453,248 B2 10/2019 Sawaki
(Continued)

FOREIGN PATENT DOCUMENTS

JP    2007-188310 A    7/2007
JP    2017-028390 A    2/2017
(Continued)

OTHER PUBLICATIONS

Nov. 15, 2022 Office Action issued in Japanese Patent Application No. 2021-188351.
(Continued)

*Primary Examiner* — Hilina K Demeter
(74) *Attorney, Agent, or Firm* — Oliff PLC

(57) ABSTRACT

An information processing system includes a position management portion, an input acquisition portion, a first image condition generator, a second image condition generator, a first determination portion, and an event generator. The first image condition generator generates a first display image viewable by the first user, from a first viewpoint corresponding to the first display medium. The second image condition generator generates a second display image viewable by the second user, from a second viewpoint corresponding to the second display medium. The first determination portion that determines whether a first predetermined condition is satisfied. The event generator causes a predetermined event to occur, that can be realized in cooperation among a plurality of display media including the first display medium and the second display medium, when the first determination portion determines that the first predetermined condition is satisfied.

15 Claims, 20 Drawing Sheets

(56) References Cited

U.S. PATENT DOCUMENTS

| | | | |
|---|---|---|---|
| 10,838,206 B2* | 11/2020 | Fortin-Deschênes | ........................ G06T 19/006 |
| 2010/0285873 A1* | 11/2010 | Tawara | ............... A63F 13/5372 463/31 |
| 2012/0308078 A1 | 12/2012 | Fujibayashi et al. | |
| 2018/0101990 A1* | 4/2018 | Yang | ........................ G06T 13/40 |
| 2018/0178126 A1 | 6/2018 | Takahashi et al. | |
| 2018/0264363 A1 | 9/2018 | Moberg et al. | |
| 2018/0329603 A1 | 11/2018 | Sawaki | |
| 2018/0330536 A1* | 11/2018 | Sawaki | ................... G06F 3/012 |
| 2018/0373328 A1 | 12/2018 | Sawaki | |
| 2019/0130599 A1* | 5/2019 | Gebbie | ................. G06V 40/23 |
| 2019/0333261 A1* | 10/2019 | Nakashima | ............. G06F 3/011 |
| 2021/0248803 A1* | 8/2021 | Kojima | ................... G06T 19/00 |
| 2022/0080316 A1 | 3/2022 | Huang | |
| 2023/0219003 A1 | 7/2023 | Hotta | |

FOREIGN PATENT DOCUMENTS

| | | |
|---|---|---|
| JP | 2018-73172 A | 5/2018 |
| JP | 2018-109835 A | 7/2018 |
| JP | 2018-109838 A | 7/2018 |
| JP | 2018-190336 A | 11/2018 |
| JP | 2019-204224 A | 11/2019 |
| WO | 2020/090786 A1 | 5/2020 |

OTHER PUBLICATIONS

Apr. 9, 2024 Office Action issued in Japanese Patent Application No. 2021-209081.
Mar. 12, 2024 Office Action issued in Japanese Patent Application No. 2021-207664.
Jul. 13, 2023 Office Action issued in U.S. Appl. No. 17/851,778.
Jul. 26, 2022 Office Action issued in Japanese Patent Application No. 2021-188351.
Feb. 21, 2023 Office Action issued in Japanese Patent Application No. 2021-106217.
Dec. 5, 2023 Office Action issued in Japanese Patent Application No. 2021-209081.
Oct. 31, 2024 Office Action issued in U.S. Appl. No. 18/601,152.
Apr. 7, 2025 Notice of Allowance issued in U.S. Appl. No. 18/601,152.
Apr. 15, 2025 Office Action issued in Japanese Patent Application No. 2024-146042.

* cited by examiner

| USER ID | USER NAME | USER AVATAR ID | POSITION/ORIENTATION INFORMATION | FRIEND INFORMATION | ... |
|---|---|---|---|---|---|
| U01 | USER A | *** | *** | *** | ... |
| U02 | USER B | *** | *** | *** | ... |
| ... | ... | ... | ... | ... | ... |

| USER AVATAR ID | FACE PARTS ID | HAIRSTYLE PARTS ID | CLOTHES PARTS ID | ... |
|---|---|---|---|---|
| A01 | *** | *** | *** | ... |
| A02 | *** | *** | *** | ... |
| ... | ... | ... | ... | ... |

| LOCATION ID | CAMERA PARAMETER | AVATAR INFORMATION | POSITION INFORMATION | DATE/TIME INFORMATION |
|---|---|---|---|---|
| A01 | *** | *** | *** | ••• |
| A02 | *** | *** | *** | ••• |
| ••• | ••• | ••• | ••• | ••• |

| ADVERTISE-MENT ID | ADVER-TISER ID | ADVERTISE-MENT CONTENT | POSITION INFORMATION | ADVERTISE-MENT PERIOD | RESULT INFORMATION | *** |
|---|---|---|---|---|---|---|
| *** | *** | *** | *** | *** | *** | *** |
| *** | *** | *** | *** | *** | *** | *** |
| ... | ... | ... | ... | ... | ... | ... |

INFORMATION PROCESSING SYSTEM, INFORMATION PROCESSING METHOD, AND INFORMATION PROCESSING PROGRAM

This application claims the benefit of priority from Japanese Patent Application Nos. 2021-188351 filed Nov. 19, 2021 and 2021-209081 filed Dec. 23, 2021, the entire contents of the prior applications being incorporated herein by reference.

TECHNICAL FIELD

This disclosure relates to an information processing system, an information processing method, and an information processing program.

BACKGROUND TECHNOLOGY

There is known technology that draws avatars based on a 3D model of each of a plurality of avatars corresponding to a plurality of users for joint distribution of video, controls motion of each of the plurality of avatars based on input information entered by the plurality of users respectively, and generates video corresponding to a virtual space including these avatars.

SUMMARY

Problems to be Resolved

Incidentally, when performing activities in a virtual space through display media such as a plurality of avatars, it is useful to provide a mechanism for promoting interaction among users via the display media through information processing.

Therefore, in one aspect, an object of this disclosure is to promote interaction among users in a virtual space through information processing.

Means of Solving Problems

In one aspect, an information processing system is provided, which comprises:

a position management portion that positions in a virtual space (i) a first display medium corresponding to a first user and (ii) a second display medium corresponding to a second user, an input acquisition portion that acquires various inputs from each user;

a first image condition generator that generates a first display image viewable by the first user, the first display image including an image of the virtual space viewed from a first viewpoint corresponding to the first display medium;

a second image condition generator that generates a second display image viewable by the second user, the second display image including an image of the virtual space viewed from a second viewpoint corresponding to the second display medium;

a first determination portion that determines whether at least one of (i) respective positions of the first display medium and the second display medium in the virtual space, and (ii) a first relative positional relationship between the first display medium and the second display medium in the virtual space, satisfies a first predetermined condition; and an event generator that causes a predetermined event that can be realized by cooperation among a plurality of display media including the first display medium and the second display medium when the first determination portion determines that the first predetermined condition is satisfied.

Effects

In one aspect, according to this disclosure, it is possible to promote interaction among users in a virtual space through information processing

DETAILED DESCRIPTION OF EMBODIMENTS

Hereinafter, embodiments will be described with reference to the drawings.

(Overview of Virtual Reality Generation System)

Figure 1:
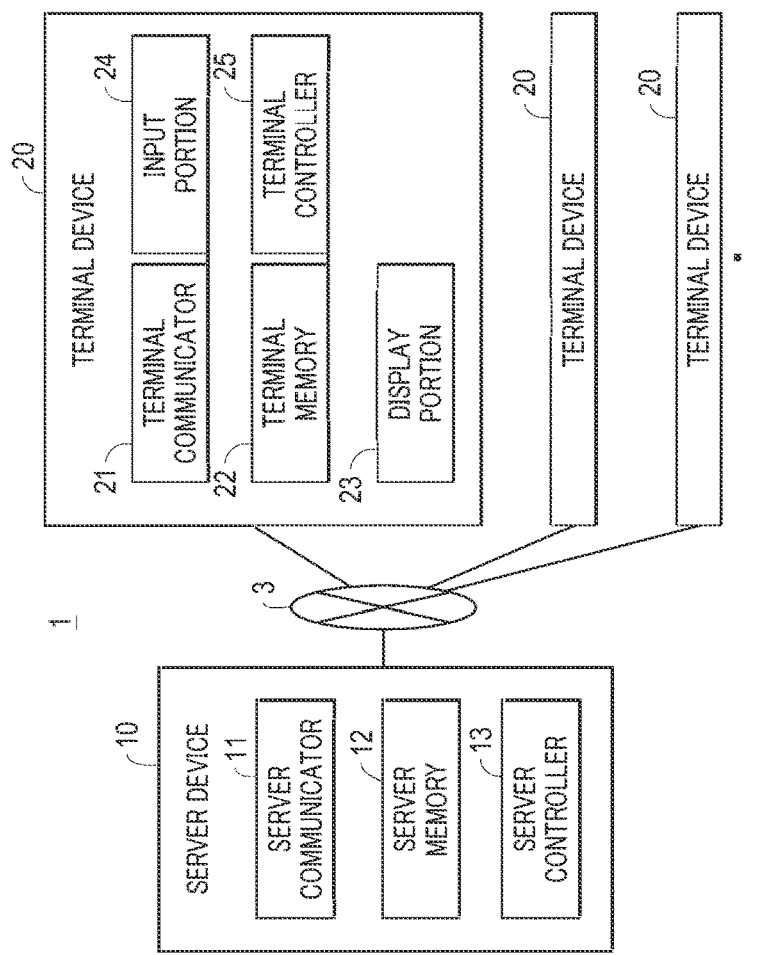
FIG. 1 is a block diagram of a virtual reality generation system according to this embodiment.

FIG. 1 is a block diagram of a virtual reality generation system 1 according to this embodiment. The virtual reality generation system 1 includes a server device 10 and one or more terminal devices 20. For convenience, three terminal devices 20 are illustrated in FIG. 1, but the number of terminal devices 20 may be two or more.

The server device 10 is, for example, a server or the like managed by an administrator who provides one or more virtual realities. The terminal device 20 is a device used by a user(s), such as a mobile phone, a smartphone, a tablet terminal, a PC (Personal Computer), a head-mounted display, a game device, or the like. The terminal device 20 is typically different for each user. A plurality of terminal devices 20 can be connected to the server device 10 via a network 3.

The terminal device 20 can execute a virtual reality application according to this embodiment. The virtual reality application may be received by the terminal device 20 from the server device 10 or a predetermined application distribution server via the network 3. Alternatively, it may be stored in advance in a memory device provided in the terminal device 20 or in a memory medium such as a memory card that can be read by the terminal device 20. The server device 10 and the terminal device 20 are communicatively connected via the network 3. For example, the server device 10 and the terminal device 20 cooperate to perform various processes related to virtual reality.

The network 3 may include a wireless communication network, the Internet, VPN (Virtual Private Network), WAN (Wide Area Network), a wired network, or any combination of these or the like.

Here, a summary of a virtual reality according to this embodiment will be described. A virtual reality according to this embodiment is, for example, a virtual reality for any reality such as education, travel, role-playing, simulation, entertainment such as games and concerts, or the like. A virtual reality medium such as an avatar is used in execution of the virtual reality. For example, virtual reality according to this embodiment is realized by a three-dimensional virtual space, various virtual reality media that appear in the virtual space, and various contents provided in the virtual space.

Virtual reality media are electronic data used in virtual reality, and include any medium such as cards, items, points, in-service currency (or virtual reality currency), tokens (for example, Non-Fungible Token (NFT)), tickets, characters, avatars, parameters, or the like. Additionally, virtual reality media may be virtual reality-related information such as level information, status information, virtual reality parameter information (physical strength, offensive ability, or the like) or ability information (skills, abilities, spells, jobs, or the like). Furthermore, the virtual reality media are electronic data that can be acquired, owned, used, managed, exchanged, combined, reinforced, sold, disposed of, or gifted or the like by a user in the virtual reality. However, usage of the virtual reality media is not limited to those specified in this specification. Hereinafter, a virtual reality medium, among virtual reality media, that can be drawn in a virtual space may be referred to as a "display medium."

(Configuration of Server Device)

The configuration of the server device 10 will be described in detail. The server device 10 is constituted by a server computer. The server device 10 may be realized by a plurality of server computers working together. For example, the server device 10 may be realized by a server computer that provides various contents, a server computer that realizes various authentication servers, and the like. Additionally, the server device 10 may also include a Web server. In this case, some functions of the terminal device 20 described hereafter may be realized by a browser processing HTML documents received from the Web server and various programs (JavaScript (registered trademark)) associated with them.

The server device 10 includes a server communicator 11, a server memory 12, and a server controller 13.

The server communicator 11 includes an interface that communicates with an external device wirelessly or by wire to send and receive information. The server communicator 11 may include, for example, a wireless LAN (Local Area Network) communication module or a wired LAN communication module or the like. The server communicator 11 can send and receive information to and from the terminal devices 20 via the network 3.

The server memory 12 is, for example, a memory device, and stores various information and programs necessary for various processes related to virtual reality. For example, the server memory 12 stores a virtual reality application.

For example, the server memory 12 stores drawing information of a user avatar M1 (an example of a display medium) as a virtual reality medium to be associated with each user. The user is a user of the virtual reality generation system 1. In addition to general users, users may include an administrative user or the like, who operates an avatar in association with an operator of the virtual reality generation system 1. The user avatar M1 is drawn in the virtual space based on the drawing information of the user avatar M1.

Additionally, the server memory 12 stores drawing information pertaining to various objects that are different from the user avatar M1, such as various items or NPCs (Non-Player Characters) and the like. The various objects in the virtual space are drawn based on such drawing information.

The server controller 13 may include a CPU (Central Processing Unit) that performs specific functions by loading a dedicated microprocessor or a specific program, a GPU (Graphics Processing Unit), and the like. For example, the server controller 13 cooperates with the terminal device 20 to execute a virtual reality application in response to user operations with respect to a display portion 23 of the terminal device 20. The server controller 13 also executes various processes related to virtual reality. Details of the specific processing of the server controller 13 are described below.

(Configuration of Terminal Device)

The configuration of the terminal device 20 will be described. As shown in FIG. 1, the terminal device 20 is provided with a terminal communicator 21, a terminal memory 22, a display portion 23, an input portion 24, and a terminal controller 25.

The terminal communicator 21 communicates with an external device wirelessly or by wire, and includes an interface for sending and receiving information. The terminal communicator 21 may include, for example, a wireless communication module, a wireless LAN communication module, or a wired LAN communication module, or the like corresponding to a mobile communication standard such as LTE (Long Term Evolution) (registered trademark), LTE-A (LTE-Advanced), a fifth generation mobile communications system, or UMB (Ultra Mobile Broadband). The terminal communicator 21 can send and receive information to and from the server device 10 via the network 3.

The terminal memory 22 includes, for example, primary and secondary memory devices. For example, the terminal memory 22 may include a semiconductor memory, a magnetic memory, or optical memory, or the like. The terminal memory 22 stores various information and programs used in the processing of virtual reality that are received from the server device 10. The information and programs used in the processing of virtual reality may be acquired from an external device via the terminal communicator 21. For example, a virtual reality application program may be acquired from a predetermined application distribution server. Hereinafter, an application program is also referred to simply as an application. For example, some or all of the above-described information on the user, information on virtual reality media of other users, and the like may be acquired from the server device 10.

The display portion 23 includes a display device, for example, a liquid crystal display or an organic EL (Electro-Luminescence) display. The display portion 23 can display various images. The display portion 23 is constituted by, for example, a touch panel, and functions as an interface that detects various user operations. Additionally, the display portion 23 may be in the form of a head-mounted display.

The input portion 24 includes an input interface including, for example, a touch panel integrated with the display portion 23. The input portion 24 can accept user input to the terminal device 20. Additionally, the input portion 24 may include physical keys or may further include any input interface, including a pointing device such as a mouse or the like. The input portion 24 may also be able to accept non-contact type user input, such as voice input and gesture input. For gesture input, a sensor (image sensor, acceleration sensor, distance sensor, or the like) may be used to detect the user's body movements. In this case, the input portion 24 may be realized by an acceleration sensor, gyro sensor, or the like built into the terminal device 20.

The terminal controller 25 includes one or more processors. The terminal controller 25 controls an operation of the entire terminal device 20.

The terminal controller 25 sends and receives information via the terminal communicator 21. For example, the terminal controller 25 receives various information and programs used for various processes related to virtual reality from at least one of (i) the server device 10 and (ii) other external servers. The terminal controller 25 stores the received information and programs in the terminal memory 22. For example, the terminal memory 22 may contain a browser (Internet browser) for connecting to a Web server.

The terminal controller 25 activates a virtual reality application in response to a user operation. The terminal controller 25 cooperates with the server device 10 to execute various processes related to virtual reality. For example, the terminal controller 25 displays an image of the virtual space on the display portion 23. On the screen, for example, a GUI (Graphical User Interface) may be displayed that detects a user operation. The terminal controller 25 can detect a user operation on the screen via the input portion 24. For example, the terminal controller 25 can detect user operations such as a tap, a long tap, a flick, a swipe, and the like. A tap operation is one in which the user touches the display portion 23 with a finger and then releases the finger. The terminal controller 25 sends the operation information to the server device 10.

(Example of Virtual Space)

The server controller 13 cooperates with the terminal device 20 to display an image(s) of a virtual space on the display portion 23. The image of the virtual space is updated according to the progress of the virtual reality and the user operation. In this embodiment, the server controller 13 cooperates with the terminal device 20 to draw an object(s) placed in a three-dimensional virtual space in an expression viewed from a virtual camera placed in the virtual space.

The drawing process described below is realized by the server controller 13. In other embodiments, all or part of the drawing process described below may be realized by the server controller 13. In the following description, at least part of the image(s) of the virtual space displayed on the terminal device 20 is generated by the server device 10. In the following description, at least part of the image(s) of the virtual space displayed on the terminal device 20 may be a web display that is caused to be displayed on the terminal device 20 based on data generated by the server device 10. Also, at least part of the image(s) may be a native display that is caused to be displayed by a native application installed on the terminal device 20.

Figure 2:
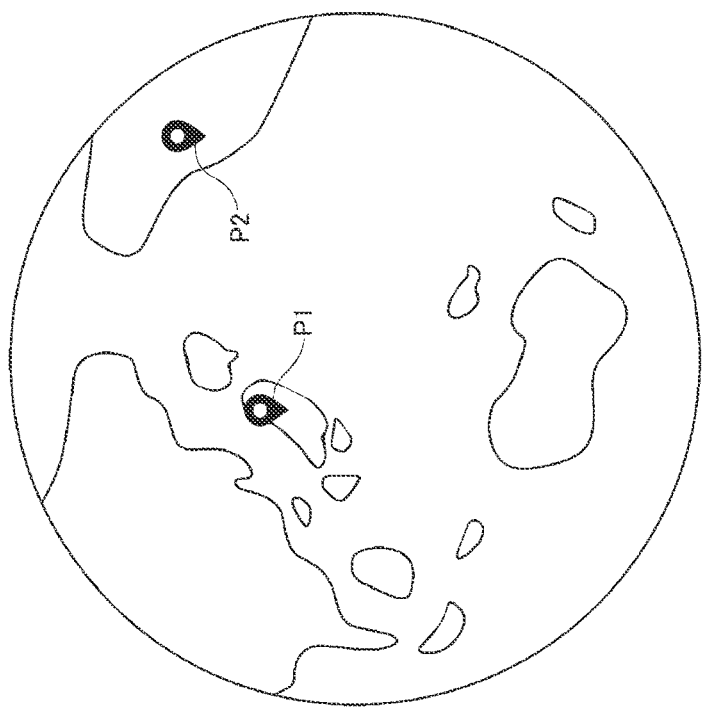
FIG. 2 is an explanatory diagram of an example of two users using the virtual reality generation system.
Figure 3:
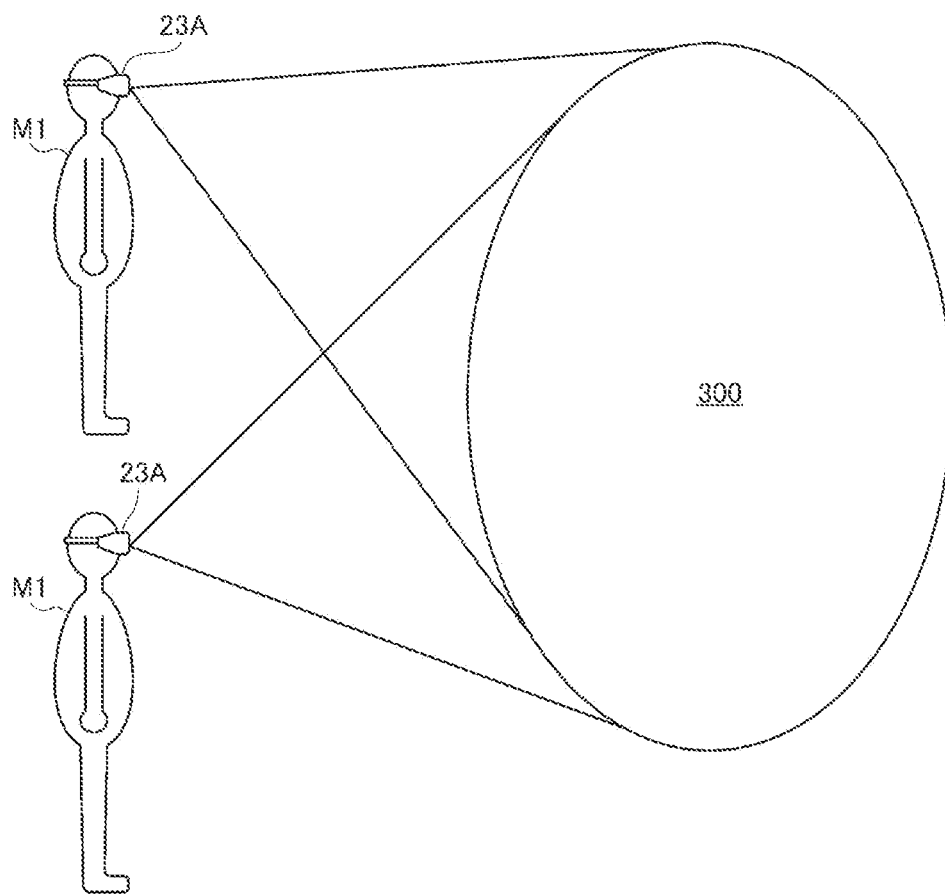
FIG. 3 is a diagram schematically showing a state in which the two users shown in FIG. 2 each wear a head-mounted display and see an image in a virtual space.

FIG. 2 is an explanatory diagram of an example of two users using the virtual reality generation system 1. FIG. 3 is a diagram schematically showing a state of two users shown in FIG. 2 each wearing a head-mounted display 23A and viewing an image of the virtual space. Here, a mode will be described in which two users share the virtual space, but it is also applicable to a mode in which three or more users share the virtual space, or a mode in which only one person occupies the virtual space.

FIG. 2 schematically shows that two users are at separate positions on the earth in real space. In this embodiment, two users at positions P1 and P2 separated from each other in the real space can interact in the same virtual space.

In this embodiment, two users wearing the head-mounted displays 23A can engage in an activity in the virtual space in the form of user avatars M1. FIG. 3 schematically shows two users at separated positions in real space looking at an image of a common virtual space 300. In this embodiment, the head-mounted displays 23A are used as a means for the users to view an image in the virtual space, but other display devices (for example, PC display) may also be used.

Figure 4:
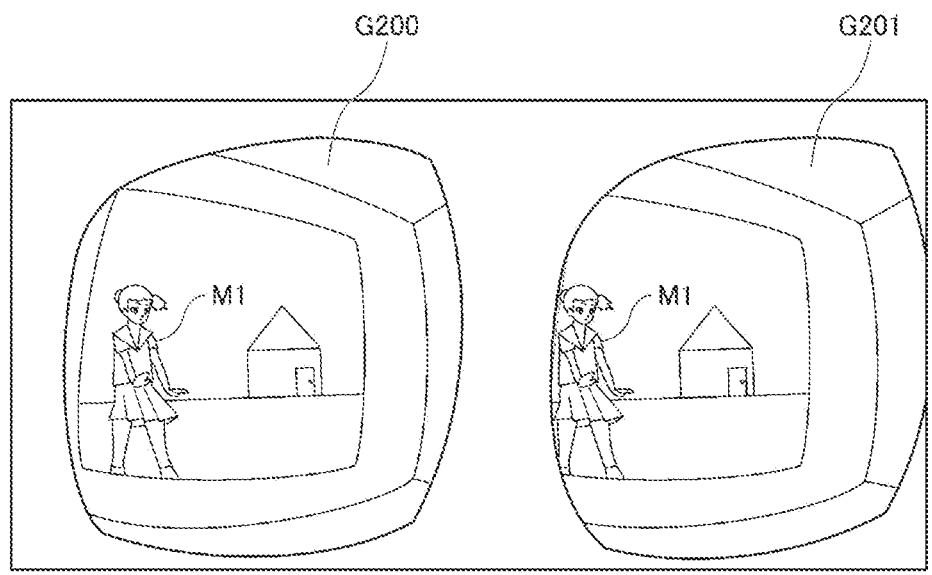
FIG. 4 is a diagram showing an example of terminal images.

FIG. 4 is an explanatory diagram of images for the head-mounted displays 23A (hereinafter also referred to as a "terminal image"), and is a diagram showing an example of the terminal image. In FIG. 4, part of the virtual space is drawn together with a user avatar M1. A method of generating a terminal image will be described hereafter.

In this embodiment, for example, as shown in FIG. 4, stereoscopic images may be generated by generating images G200 and G201 that are visible to the right and left eyes, respectively. FIG. 4 schematically shows the images G200 and G201, which are viewed by the right and left eyes, respectively. Hereinafter, unless otherwise stated, an image of the virtual space generated as a terminal image refers to the entire image represented by images G200, G201.

Figure 5:
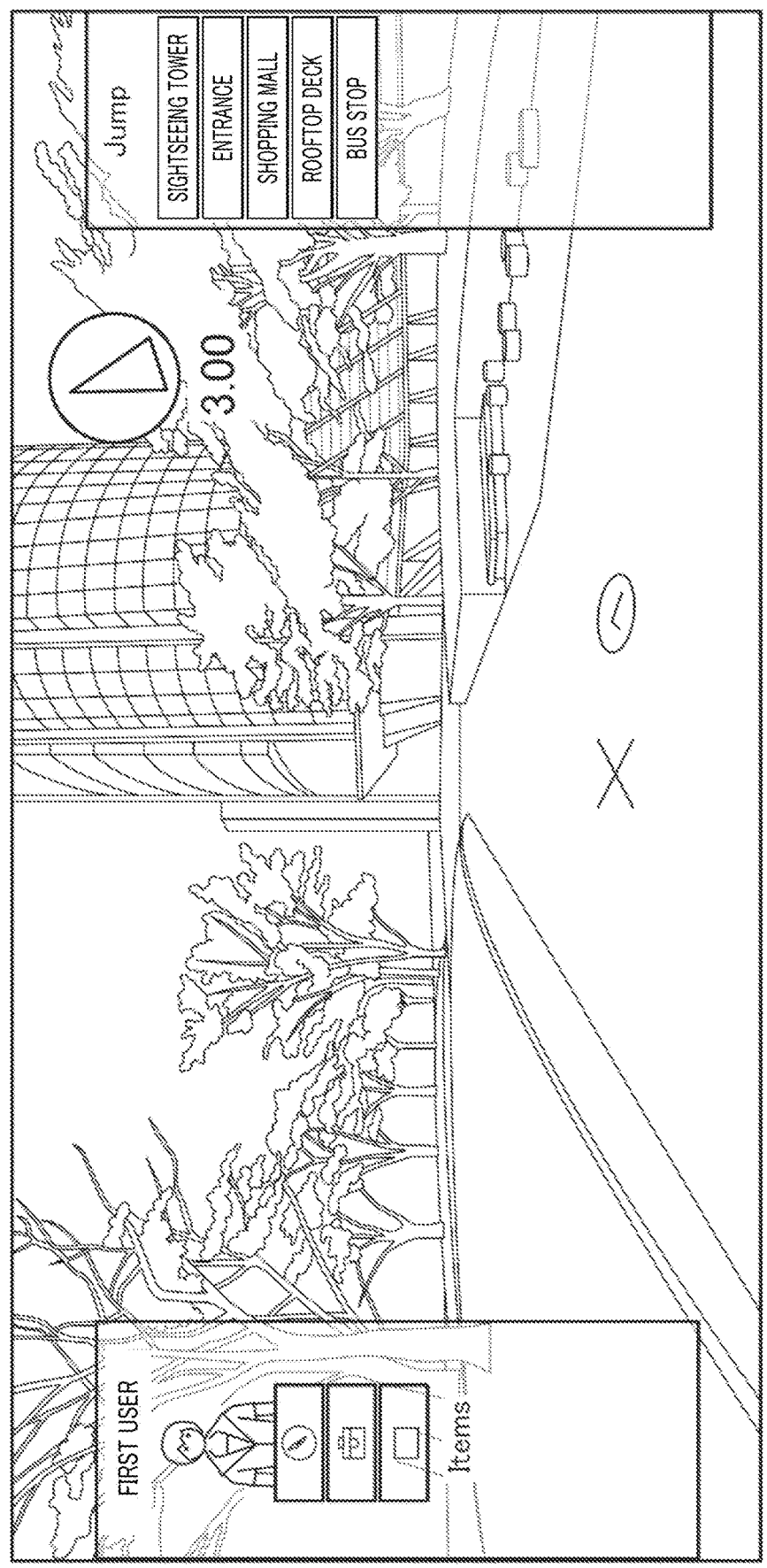
FIG. 5 is an explanatory diagram of an example of a suitable terminal image in this embodiment.

FIG. 5 is an explanatory diagram of an example of a terminal image that is suitable for this embodiment. The terminal image shown in FIG. 5 may be an image for one user (terminal image viewed by one user through the head-mounted display 23A).

In this embodiment, the terminal image preferably includes realistic images based on a photograph or computer graphics (CG) of a real space, as shown schematically in FIG. 5. For example, a terminal image is an image of an existing place. This allows the user to get the illusion of being there. As a result, a range of activities in the virtual space by each user can be expanded and the like, and the stimulation of activities can be promoted.

In this embodiment, a terminal image is a realistic image based on a photograph or computer graphics of a real space (hereinafter referred to as a "real space image") and is formed by superimposing an interface image that functions as a GUI, the user avatar M1, or the like, as appropriate, on the real space image (for example, combined in JavaScript (registered trademark)). The real space image may be acquired using, for example, the "Google Street View Image API" provided by Google Inc. or a similar API (Application Programming Interface). In this case, street view images acquired from designated latitude and longitude, Pano (panorama) ID, and the like can be imported as real space images.

However, in a modified example, instead of the real space image, an image of a space that partially or entirely does not correspond to the real space may be used. For example, an image of the virtual space of a game or an image of a three-dimensional space of the Metaverse may be used. Also, the real space image may be not only an image corresponding to a current real space, but also an image corresponding to a past real space or a real space based on a prediction of the future.

In this embodiment, when the real space image of the terminal image viewed by one user is an image of an existing place, the position of the user avatar M1 corresponding to the one user is associated with position information associated with the real space image. For example, when the real space image of the terminal image viewed by one user is an image of Tokyo Tower, the user avatar M1 corresponding to the one user is positioned where Tokyo Tower can be seen. Therefore, in the following description, one user avatar M1 corresponding to one user moving to a certain place is substantially synonymous with a terminal image corresponding to the one user becoming an image related to the place. In this way, the user can go to various places in the virtual space via the user avatar M1.

Figure 6:
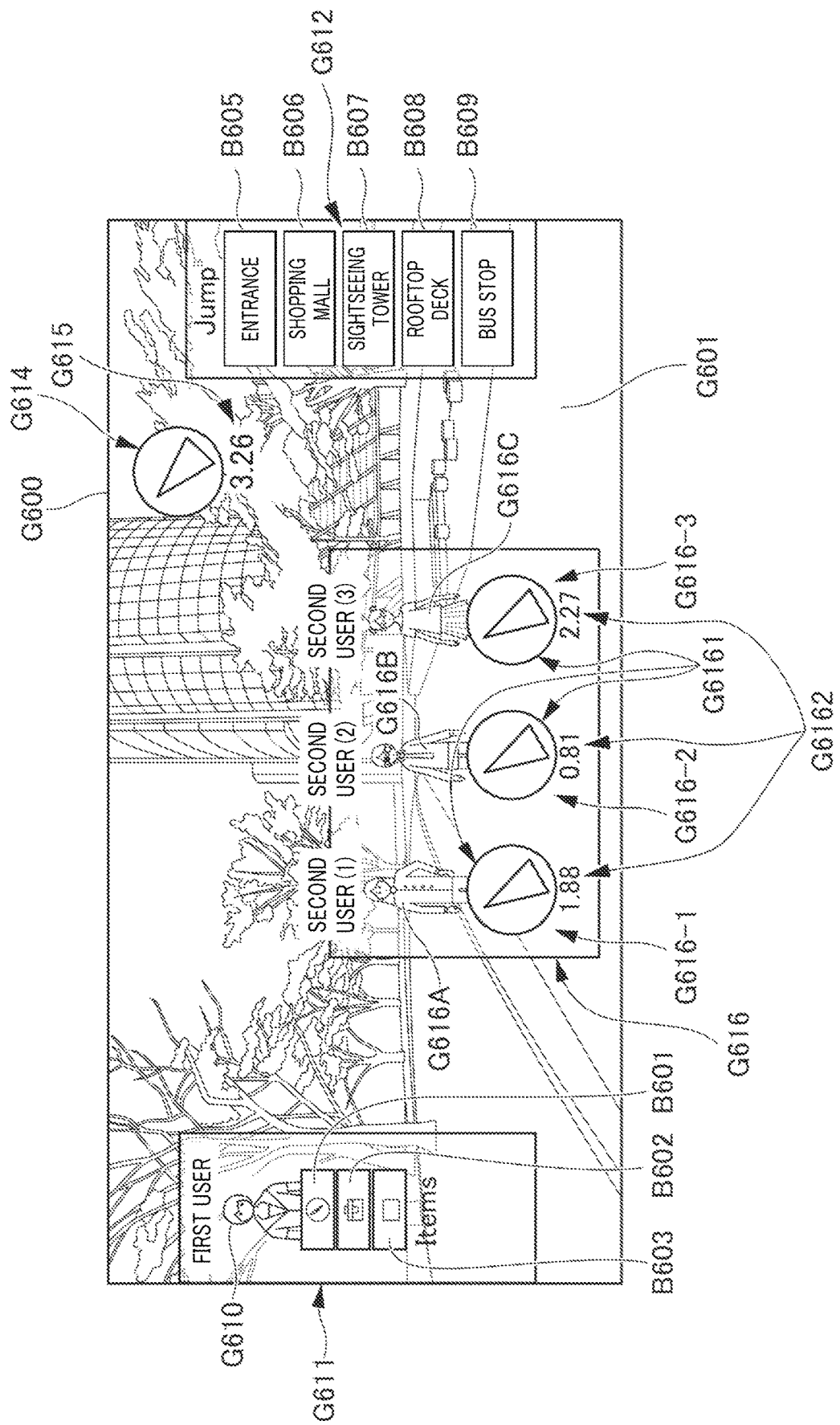
FIG. 6 is an explanatory diagram of an example of a terminal image for a first user when four users share the same virtual space.

FIG. 6 is an explanatory diagram of an example of a terminal image G600 for one user (hereinafter referred to as a "first user") when four users share the same virtual space.

A terminal image G600 shown in FIG. 6 includes, on a real space image G601, (i) an image G610 showing the user avatar M1 (hereinafter also referred to as "first user avatar M1") (an example of a first display medium) corresponding to the first user, (ii) user interfaces G611, G612 that are GUIs that can be operated by the first user, (iii) a direction guide image G614, (iv) a distance guide image G615, and (v) friend guide images G616.

The image G610 is an image for allowing the first user to recognize his/her own user avatar M1. Additionally, the image G610 may be omitted.

The user interface G611 includes various operation buttons B601 to B603 that can be operated by the first user. The operation button B601 is a button for turning on/off a display status of the friend guide image G616. The operation button B602 is a shutter button and is operated when taking a picture (taking a picture in the virtual space) such as in commemorative picture taking described below. The operation button B603 is a button for viewing or the like the picture or video obtained in the commemorative picture taking. Hereinafter, unless otherwise stated, taking a picture means taking a picture in a virtual space, and a picture is synonymous with image data based on the terminal image stored at the time of taking the picture.

The user interface G612 includes instantaneous movement buttons B605 to B609. Each of the buttons B605 to B609 may be associated with information (for example, text information) indicating a destination. For example, the button B605 is a button for instantaneously moving to the entrance of a facility or the like where the first user avatar M1 is currently located.

The number of buttons B605 to B609 and their destinations are arbitrary. However, the destination may preferably include a place that is very difficult to reach in real space (for example, the top of Mt. Everest, the roof of a high-rise building, or the like). In this case, users can easily go to places that can only be reached in virtual space via the user avatar M1 and have valuable experiences and the like. The destination(s) for instantaneous movement may be set by the user as desired.

The direction guide image G614 is information representing or suggesting a direction (relative direction based on the first user avatar M1) when viewed from the first user avatar M1, and is information representing or suggesting the direction of a specific target position or the direction of a specific item. A specific target position may be, for example, a location designated in a mission (for example, Tokyo Tower or the like) if a game with a mission is played. In this case, the specific target position may be set in a manner that has some range. A specific item (an example of a specific display medium) may be any virtual reality medium. The specific item may be, for example, a target item to be acquired designated in a mission (described below) when a game with a mission is played. Thereby, the first user can easily understand the direction of the specific target position or the direction of the specific item by looking at the direction guide image G614, and can easily move his/her first user avatar M1 to the specific target position or near the specific item, as appropriate.

The direction guide image G614 may be associated with information (for example, text information) indicating the specific target position or the specific item. Thereby, the first user can easily understand the specific target position or the specific item.

The direction guide image G614 may be, for example, an image in the form of a compass indicating the direction of a specific target position or the direction of a specific item, as shown in FIG. 6. The direction guide image G614 may be drawn in plan view. In this case, the direction indicated by the pointed end may correspond to the direction of the specific target position or the direction of the specific item in plan view (when viewed in a bird's-eye view).

The direction guide image G614 may be omitted, or the display may be turned on/off by the first user.

The distance guide image G615 is information indicating or suggesting a relative distance from the first user avatar M1 and is information indicating or suggesting the distance from the first user avatar M1 to the specific target position or the specific item. The distance guide image G615 may be, for example, a numeric image representing the corresponding distance, as shown in FIG. 6. Thereby, the first user can easily understand the distance to the specific target position or the specific item by looking at the distance guide image G615. The distance guide image G615 is preferably displayed in the vicinity of the direction guide image G614, together with the direction guide image G614.

The friend guide image G616 indicates position information of each user avatar M1 (hereinafter also referred to as a "second user avatar M1") (an example of a second display medium) corresponding to another user (hereinafter referred to as a "second user"). Therefore, the first user can move the first user avatar M1 while keeping track of the positional relationship with the second user avatars M1 and the positions of the second user avatars M1. Thereby, the first user can easily move his/her first user avatar M1 to the vicinity of the second user avatars M1 by looking at the friend guide image G616. On the second user side as well, a similar friend guide image is displayed in the terminal images for the second users. Thus, each user can interact with each other while determining the positional relationship of each other's user avatar M1.

In the example shown in FIG. 6, the friend guide image G616 includes guide images G616-1 to G616-3 for each of the second user avatars M1, along with images G616A to G616C showing respective second user avatars M1. In this case, the friend guide image G616 includes guide images G616-1 to G616-3 corresponding to the three second users.

The guide images G616-1 to G616-3 are arranged in association with images G616A to G616C representing the corresponding second user avatars M1, respectively. For example, the guide image G616-1 related to one second user avatar M1 is arranged in association with the image G616A showing the one second user avatar M1 (in FIG. 6, it is arranged below the image G616A).

The guide image G616-1 (the same applies to the guide images G616-2 and G616-3) related to one corresponding second user avatar M1 includes a direction guide image G6161 and a distance guide image G6162.

Each direction guide image G6161 is information representing or suggesting a direction when viewed from the first user avatar M1 (a relative direction based on the first user avatar M1), and is information representing or suggesting the direction of one corresponding second user avatar M1. Thereby, the first user can understand the directions of the desired second user avatars M1 by looking at the direction guide images G6161, and can easily move his/her first user avatar M1 to be near the desired second user avatar M1 as appropriate.

The direction guide images G6161 may each be, for example, an image in the form of a compass representing the direction of one corresponding second user avatar M1, as shown in FIG. 6. In the same manner as the direction guide image G614 described above, the direction guide images G6161 may be drawn in plan view. In this case, the direction indicated by the sharp tip may correspond to the direction of the one corresponding second user avatar M1 in plan view (when viewed in a bird's-eye view). In a situation where unknown (non-friend) avatars are also in the same virtual space, a compass image is displayed showing the positions of friends, but a compass image for the unknown avatars is not shown.

Each distance guide image G6162 is information (i) representing or suggesting the relative distance from the first user avatar M1 and (ii) representing or suggesting the distance from the first user avatar M1 to a second user avatar M1. Similar to the distance guide image G615 described above, each distance guide image G6162 may be, for example, an image of numbers representing the corresponding distance, as shown in FIG. 6. Thereby, the first user can easily understand the distances to the second user avatars M1 by looking at the distance guide images G6162. Each distance guide image G6162 is preferably displayed in the vicinity of each direction guide image G6161 related to the same second user avatar M1, together with the direction guide image G6161.

In this embodiment, a predetermined event occurs when at least one of the following meets a first predetermined condition: (i) the respective positions of the first user avatar M1 and the second user avatar M1 in the virtual space, and (ii) a first relative positional relationship between the first user avatar M1 and the second user avatar M1 in the virtual space.

The first predetermined condition is arbitrary, but may be satisfied under circumstances where there is a high likelihood of interaction between the first and second user avatars. In this embodiment, the first predetermined condition is satisfied when the first user avatar M1 and the second user avatar M1 are in close proximity to each other. For example, the first predetermined condition is satisfied when the distance between the first user avatar M1 and the second user avatar M1 (relative distance in the virtual space) is within a predetermined distance. In this case, the predetermined distance corresponds to a distance at which the first user avatar M1 and the second user avatar M1 are in proximity to each other, and may be adapted appropriately. Alternatively, the first predetermined condition may be met when the first user avatar M1 and the second user avatar M1 are within a predetermined distance from a common specific position.

The predetermined event is arbitrary, but preferably is an event that can be realized by cooperation between the first user avatar M1 and the second user avatar M1 that meet the first predetermined condition. In this case, interaction between the first user and the second user via the first user avatar M1 and the second user avatar M1 is promoted.

For example, events that can be realized by cooperation between the first user avatar M1 and the second user avatar M1 may be, for example, the following events E1 to E5.

Event E1: An event that moves instantaneously to a common room or a specific location.

Event E2: An event that expands the space available for movement (a gate opens when users gather at the gate).

Event E3: An event where everyone can play mini-games together.

Event E4: An event where only gathered members can chat.

Event E5: An event begins in which everyone cooperates to complete a mission (treasure hunt, riddle solving game, or the like).

Here, a common room is a spatial portion formed as a virtual space, and may be a spatial portion where specific content is provided. The specific content may be entertainment content that can be viewed. Alternatively, the common room may be a spatial part in which no specific content is provided, such as a chat room. In this case, event E1 could be the same as event E4. The chat may be voice chat and/or text chat. Also, "everyone" refers to the first user avatar M1 and the second user avatar M1, but the second user avatar M1 may be more than one.

The predetermined event may be an event set by an administrator, or may be an event based on a UGC (User Generated Content) that can be generated by each user. In this case, a predetermined event based on various types of content can be set. The UGC can be produced by a content designer(s) (user(s)) in a table format (database). Such UGC can also be distributed in a content market. Additionally, the user avatar (user avatar pertaining to the content designer of UGC or user involved in its production) may directly guide "the trip I wish to introduce" as a tour guide in connection with a predetermined event. Furthermore, UGCs pertaining to scenarios of various experiences may be placed in a gallery, so that each user can have an additional experience as a visitor through a user avatar. In this case, the UGCs can be produced by a content designer(s) in a table format (database). Furthermore, coordinates, viewpoints, events, items, messages, or the like can be easily converted into experience scenarios.

In this embodiment, as an example, the predetermined event includes an image acquisition event such as commemorative picture taking. In this case, the image acquisition event may be an event in which an image including the first user avatar M1 and the second user avatar M1 with a location as a background is acquired. If the predetermined event includes multiple types of events (for example, events E1 to E5 described above), which event occurs may be selected by the first user or the like, or it may be determined according to the location.

In this case, the image acquisition event may be able to occur at any location in the virtual space, or only at a specific location (for example, a scenic spot or a famous landmark). In the latter case, the first predetermined condition is that the respective positions of the first user avatar M1 and the second user avatar M1 may be satisfied if they belong to corresponding specific locations. More specifically, the first predetermined condition may be satisfied if the respective positions of the first user avatar M1 and the second user avatar M1 are within a predetermined distance from a reference position (specific position) of the corresponding specific location.

Figure 7:
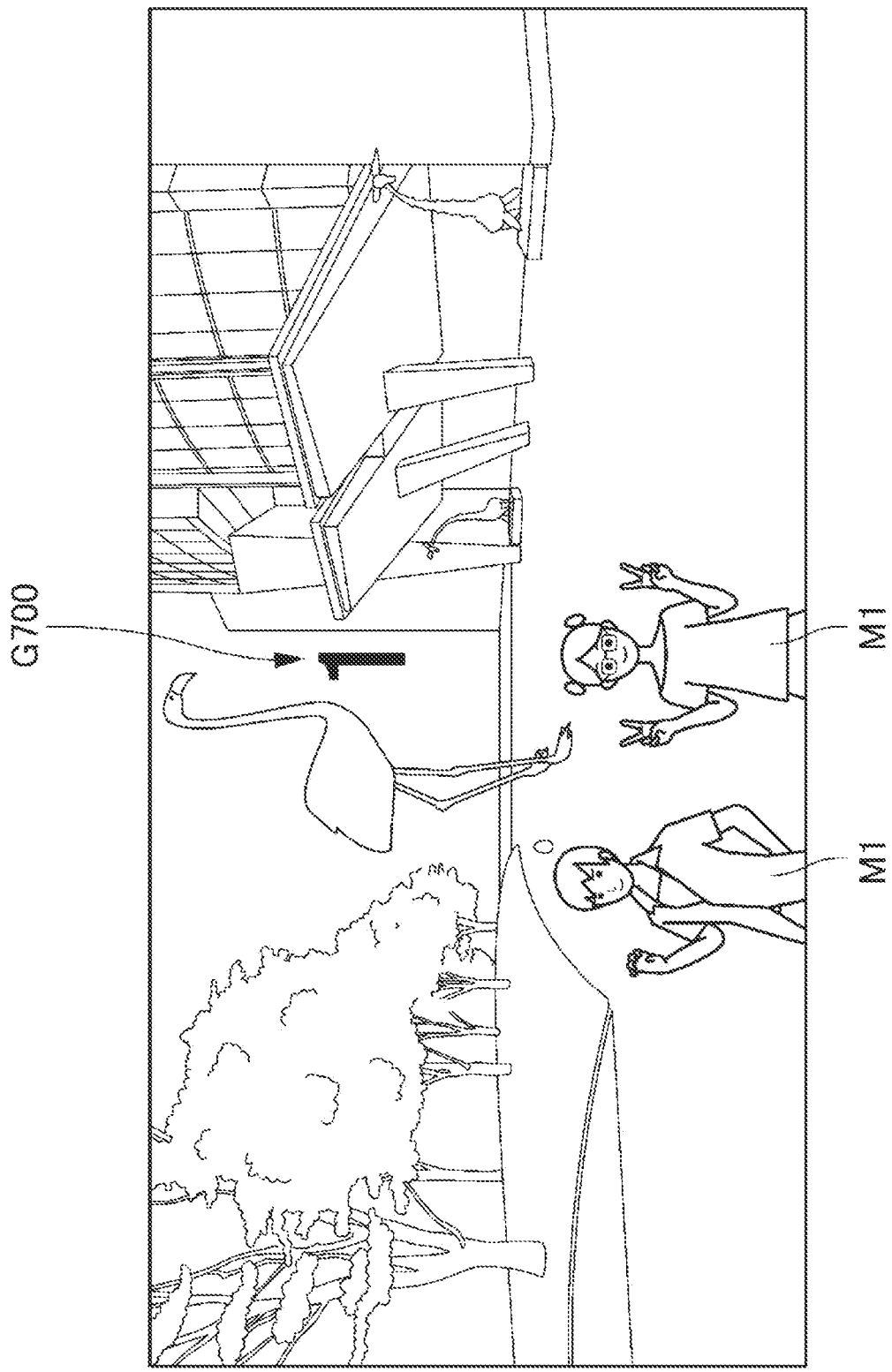
FIG. 7 is an explanatory diagram (part 1) of an image acquisition event.
Figure 8:
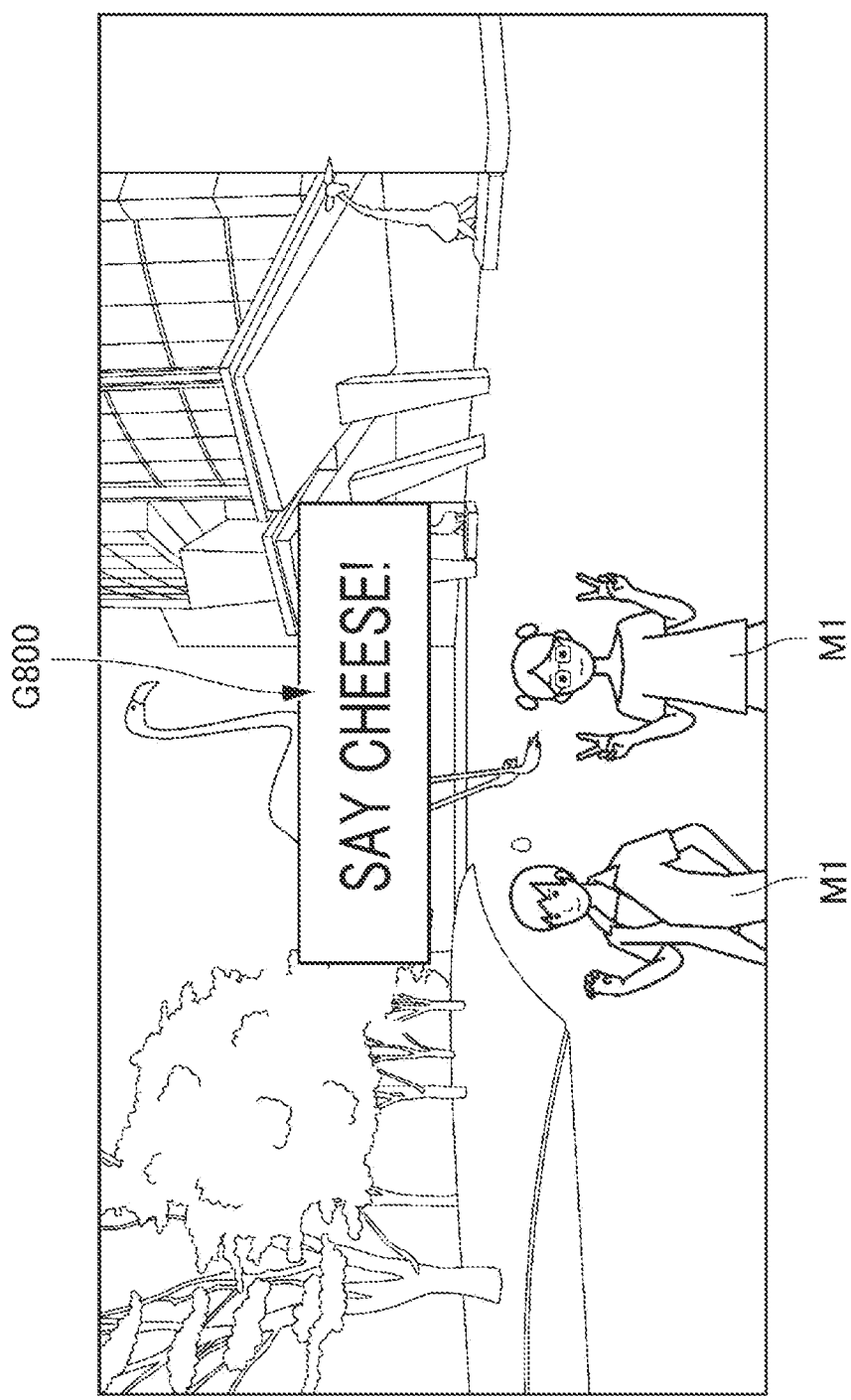
FIG. 8 is an explanatory diagram (part 2) of the image acquisition event.

FIGS. 7 and 8 are explanatory diagrams of an image acquisition event according to an example.

In this case, when the first predetermined condition is satisfied, the operation button B602 (see FIG. 6), which is the shutter button, is made active (operable) as preparation processing for the image acquisition event. When the first user operates the operation button B602, an image acquisition event occurs. Alternatively, an image may be acquired when a user or an avatar performs a specific action other than pressing the shutter button. Examples of specific actions include: consuming behaviors such as purchasing items, sending chat messages, sending "likes," sending "emotes," and colliding with objects (e.g., shaking hands with other avatars, and the like).

When the image acquisition event occurs, first, as shown schematically in FIG. 7, the first user avatar M1 and a second user avatar M1 that have met the first predetermined condition (in FIG. 7, the first user avatar M1 and one second user avatar M1) are drawn in the terminal image for the first user. At this time, the first user avatar M1 and the second user avatar M1 may each be drawn in a mode of taking one of a plurality of poses. Which of the plurality of poses is to be assumed may be randomly determined, may be determined according to the position of the image acquisition event, or may be selectable by the corresponding user. Alternatively, a unique pose may be prepared for each user (user avatar M1) as appropriate. Also, the pose may be set by tracking the user's movements.

Then, a countdown begins (in FIG. 7, the countdown image G700 of "1" out of 3, 2, 1 is shown), and finally, as shown in FIG. 8, a shutter sound is output with text information G800 such as "Say cheese!," as shown in FIG. 8, and the picture is taken. In this case, the picture is the terminal image itself at that time, but unnecessary parts (for example, the user interface G611 and the like) may be removed as appropriate. During the countdown of the image acquisition event, the user can pose or select a pose. In addition, interval shooting (shooting multiple images, each after a lapse of a certain period of time) may be performed. Moreover, multiple cameras may be used for shooting, such as a fixed-point camera, a camera following an avatar, a camera shooting a front of the avatar, and the like.

According to such an image acquisition event, the first user can take a commemorative picture in the same manner as in real space, for example, at a famous or scenic spot, while interacting with the second user via the first user avatar M1 and the second user avatar M1. Also, the image acquisition may or may not be visible to surrounding avatars.

In the example shown in FIGS. 7 and 8, the picture taken in the commemorative picture taking (for example, a "two shot" picture capturing two people) shows the first user avatar M1 and the second user avatar M1, but images of the first user and the second user in real space may be used instead of the first user avatar M1 and the second user avatar M1. In this case, the images of the first user and the second user to be used may be prepared in advance, or may be taken at that time in real space. In this case, the first and second users are positioned in front of their respective cameras, and the images captured by their cameras are incorporated into the commemorative picture taken. In this case, only a part (for example, only the face part) of the image of the first user and the image of the second user in real space may be used. In this case, the other parts (for example, the parts other than the face) may be an image of a predetermined character (for example, a local character) or parts of the corresponding user avatar M1. In addition, during the image acquisition event, the clothing of the first user avatar M1 and/or the second user avatar M1 may change (for example, the clothing may change to clothing corresponding to the place).

Furthermore, a special avatar, such as an avatar pertaining to a celebrity or influencer, may appear during commemorative picture taking for an image acquisition event, according to a selection (request) by the user that causes the image acquisition event to occur. This allows the user to obtain an image including the special avatar at the image acquisition event. In this case, the locations, times, or the like where pictures can be taken with the special avatar may be limited. Also, even when unknown (non-friend) avatars exist in the virtual space, the unknown avatars will not appear in the image. Alternatively, after the image is captured, the user can delete the avatars he or she wishes to erase from the image. Alternatively, the user can change each avatar's expression, direction, pose, and appearance in the image afterward.

Additionally, when a commemorative picture is taken for an image acquisition event, other user avatars M1 located at the same location in the past may appear according to a selection (request) by the user that causes the image acquisition event to occur. Thereby, a group picture-like image containing many user avatars at the image acquisition event can be obtained. In this case, the other user avatars M1 that can have their picture taken together, the location, time, or the like, may be restricted as appropriate. In addition, the user may select an avatar with whom to take the image (e.g., from among multiple nearby avatars). Also, if no other avatars are nearby, an image may be taken of the first user avatar M1 alone. Even if other avatars are nearby, an image may be taken of the first user avatar M1 alone.

Incidentally, in a configuration that thus enables a predetermined event to occur based on the relative positional relationship between the user avatars M1 in the virtual space, it is desirable that the relative positional relationship between the user avatars M1 be easy for each user to understand.

In this respect, as in real space, each user can keep in touch with each other through chatting, and the like, to understand the relative positional relationship between the user avatars M1. However, it may be difficult for the users to meet at the same place in an unfamiliar location.

In contrast, according to this embodiment, since the friend guide image G616 can be displayed as described above, each user can move easily his/her own user avatar M1 while obtaining information related to the location of other user avatars (M1) from the friend guide image G616 so that the first predetermined condition is satisfied. As a result, the movement of the user avatars M1 in the virtual space can be made more efficient, and the processing load can be reduced.

Furthermore, such a friend guide image G616 is also suitable for a terminal device 20 (for example, a smartphone) that has a relatively small screen and a limited field of view. Even in the case of such a terminal device 20, the user can easily recognize the position (relative position) of the desired second user avatar M1 and can easily move his/her own first user avatar M1 to a desired position.

Additionally, in this embodiment, when it is determined that a second predetermined condition is satisfied based on the position of the first user avatar M1 in the virtual space and the position of a specific item in the virtual space, an event (hereinafter also referred to as an "item acquisition event") that causes the first user or the first user avatar M1 to acquire the specific item (an example of predetermined information) is generated. Furthermore, instead of or in addition to having the first user or first user avatar M1 acquire the specific item, it is acceptable to have the first user or first user avatar M1 acquire a virtual reality medium (another example of predetermined information) corresponding to the specific item.

The specific item is arbitrary, but may be, as described above, for example, a target item for acquisition designated in a mission when a game with a mission is played. In this embodiment, the target item for acquisition is an item that corresponds to the location, and may be set as appropriate. For example, in the case of a location with a flamingo object, the target item for acquisition may be an item that recalls a flamingo egg.

The specific item may correspond to a real object. For example, if a statue of a frog is installed at a certain location as a real object, the specific item to be associated with that location may be a display medium that imitates the frog.

The virtual reality medium corresponding to the specific item may be any virtual reality medium as described above, preferably a virtual reality medium directly or indirectly associated with the specific item. For example, if the specific item is a target item to be acquired as designated in a mission, the virtual reality medium corresponding to the specific item may be certificate information certifying that the mission has been completed.

The second predetermined condition is arbitrary, but may be determined based on a positional relationship (distance), similar to the first predetermined condition described above. In this embodiment, the second predetermined condition is satisfied when the first user avatar M1 and the specific item are in close proximity to each other. For example, the second predetermined condition is satisfied when the distance (relative distance in the virtual space) between the first user avatar M1 and the specific item is within a predetermined distance. In this case, the predetermined distance corresponds to the distance between the first user avatar M1 and the specific item when they are in close proximity to each other, and may be adapted as appropriate. The predetermined distance for the second predetermined condition may be the same as the predetermined distance for the first predetermined condition described above.

Incidentally, in a configuration that enables an item acquisition event to occur based on the relative positional relationship between the user avatar M1 and a specific item in the virtual space, it is desirable that the relative positional relationship between the user avatar M1 and the specific item be easy for each user to understand.

In this regard, according to this embodiment, as described above with reference to FIG. 6, the direction guide image G614 and the distance guide image G615 can be displayed. Therefore, each user can easily move his/her own user avatar M1 so that the second predetermined condition is satisfied while obtaining information from the direction guide image G614 and the distance guide image G615. As a result, the movement of the user avatar M1 in the virtual space can be made more efficient, and the processing load can be reduced.

Furthermore, the direction guide image G614 and the distance guide image G615 thus described above are also suitable for a terminal device 20 (for example, a smartphone) that has a relatively small screen and a limited field of view. Even in the case of such a terminal device 20, the user can easily recognize the position (relative position) of the desired specific item and can easily move his/her own first user avatar M1 to a desired position.

Figure 9:
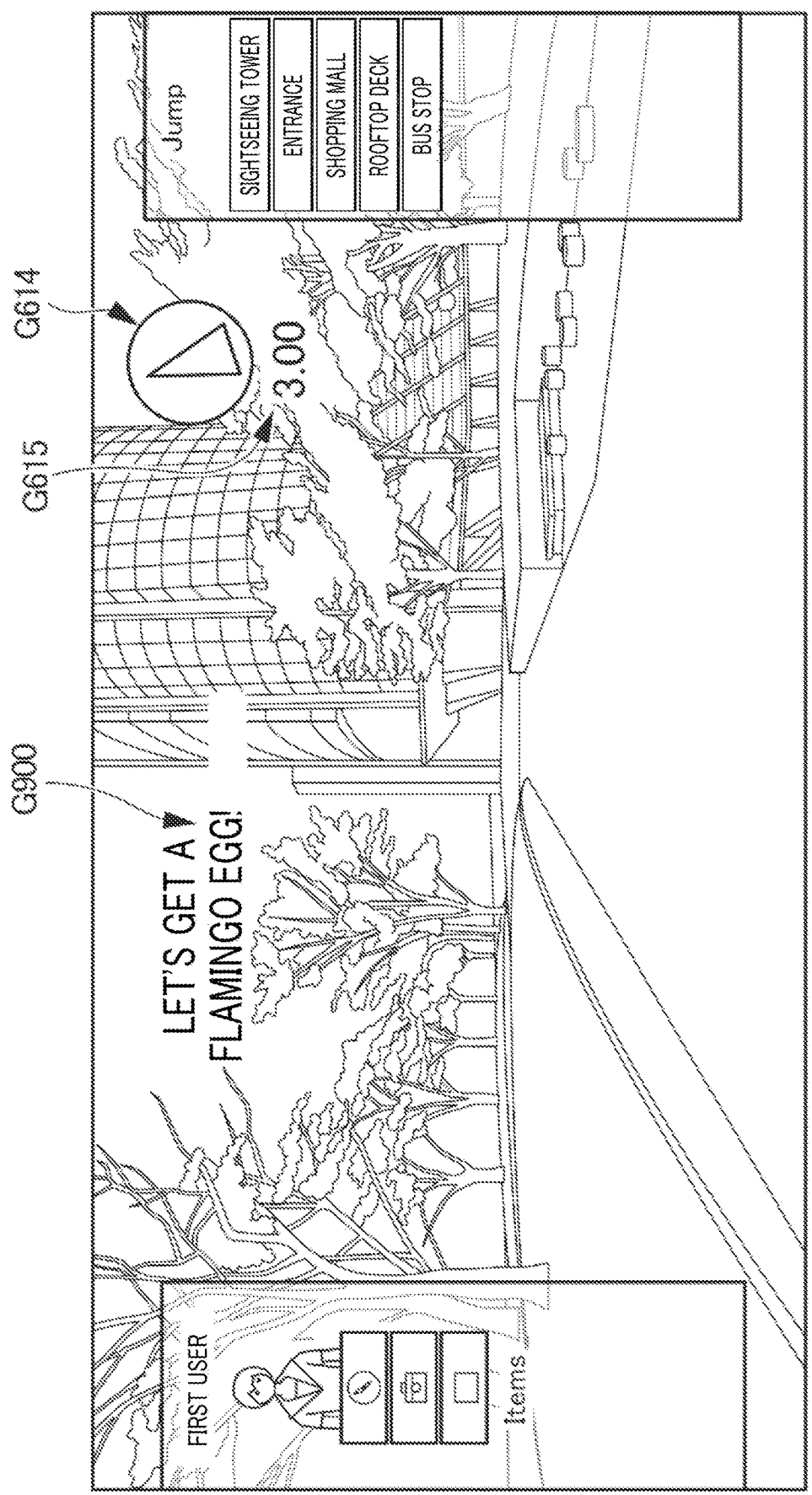
FIG. 9 is an explanatory diagram (part 1) of an item acquisition event.
Figure 10:
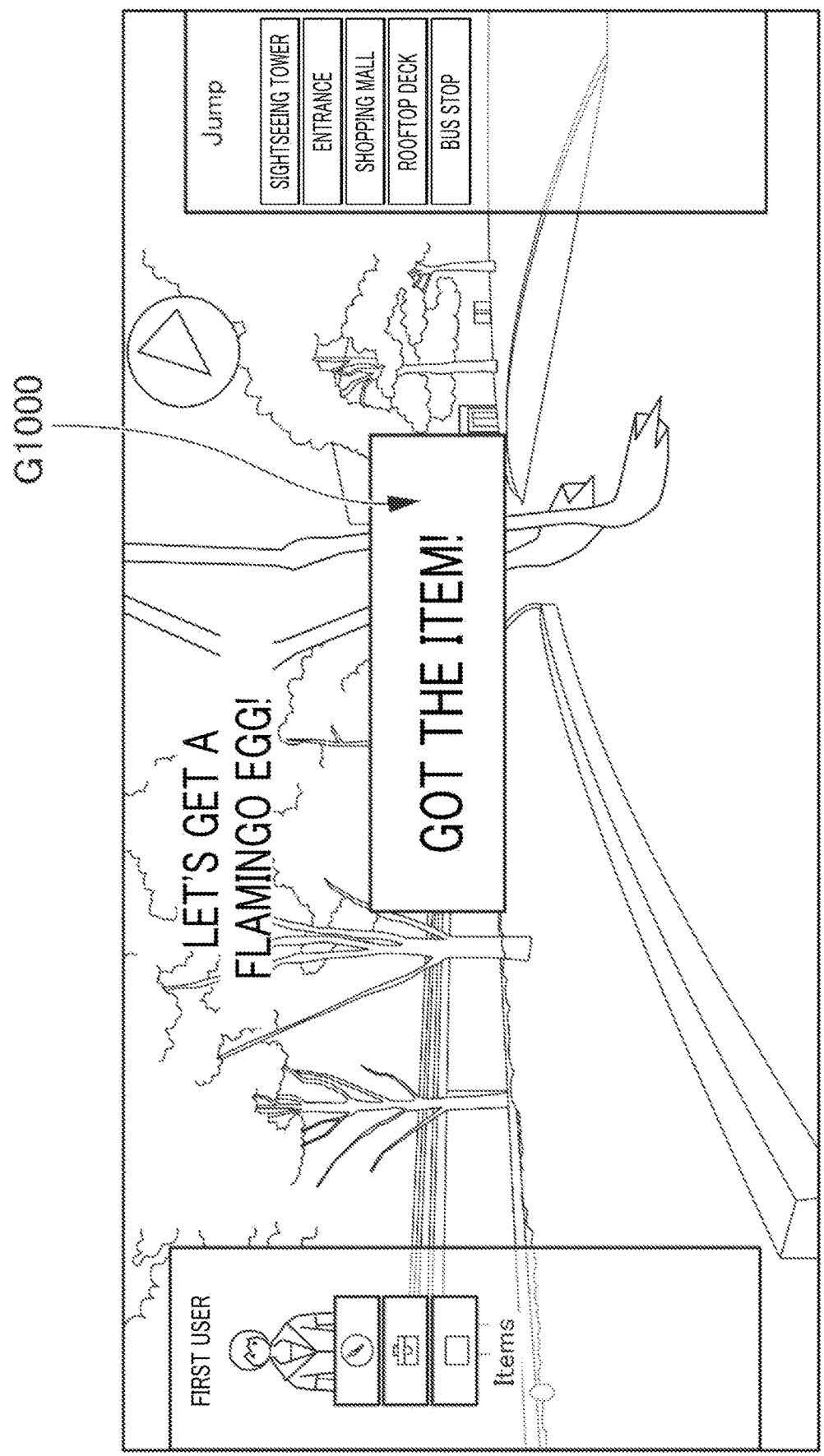
FIG. 10 is an explanatory diagram (part 2) of the item acquisition event.

FIGS. 9 and 10 are explanatory diagrams of an item acquisition event according to an example.

As shown in FIG. 9, first, the first user may be presented with a mission for an item acquisition event. In this case, the mission is to acquire an item of a flamingo egg as the target item for acquisition. As shown in FIG. 9, the terminal image includes the direction guide image G614 showing the direction and location of the flamingo egg and the distance guide image G615, along with text information G900 representing the mission. Thereby, the first user can easily understand the direction and position of the item of the flamingo egg and move the first user avatar M1 accordingly.

Then, when the first user avatar M1 moves close to the item of the flamingo egg, as shown in FIG. 10, text information G1000 stating "Get the item!" is drawn to notify the user that the mission has been completed. In this case, the user is assigned the item of the flamingo egg as the target item for acquisition. During the item acquisition event, a picture may be automatically taken as a commemoration. In this case, the first user avatar M1 may be included in the terminal image in the pose of holding the target item for acquisition, and the picture may be taken automatically. In this case as well, as in the image acquisition event described above, the picture is the terminal image itself at that time, but unnecessary parts (for example, the user interface G611) may be removed as appropriate.

Next, with reference to FIG. 11 and thereafter, examples of the configuration of the virtual reality generation system 1 described above will be explained in turn.

Hereinafter, the server device 10 realizes an example of the information processing system, but as described hereafter, each element of one terminal device 20 (see the terminal communicator 21 to the terminal controller 25 of FIG. 1) may also realize an example of the information processing system. Also, a plurality of terminal devices 20 may cooperate to realize an example of the information processing system. Additionally, the server device 10 and one or more terminal devices 20 may cooperate to realize an example of the information processing system.

Figure 11:
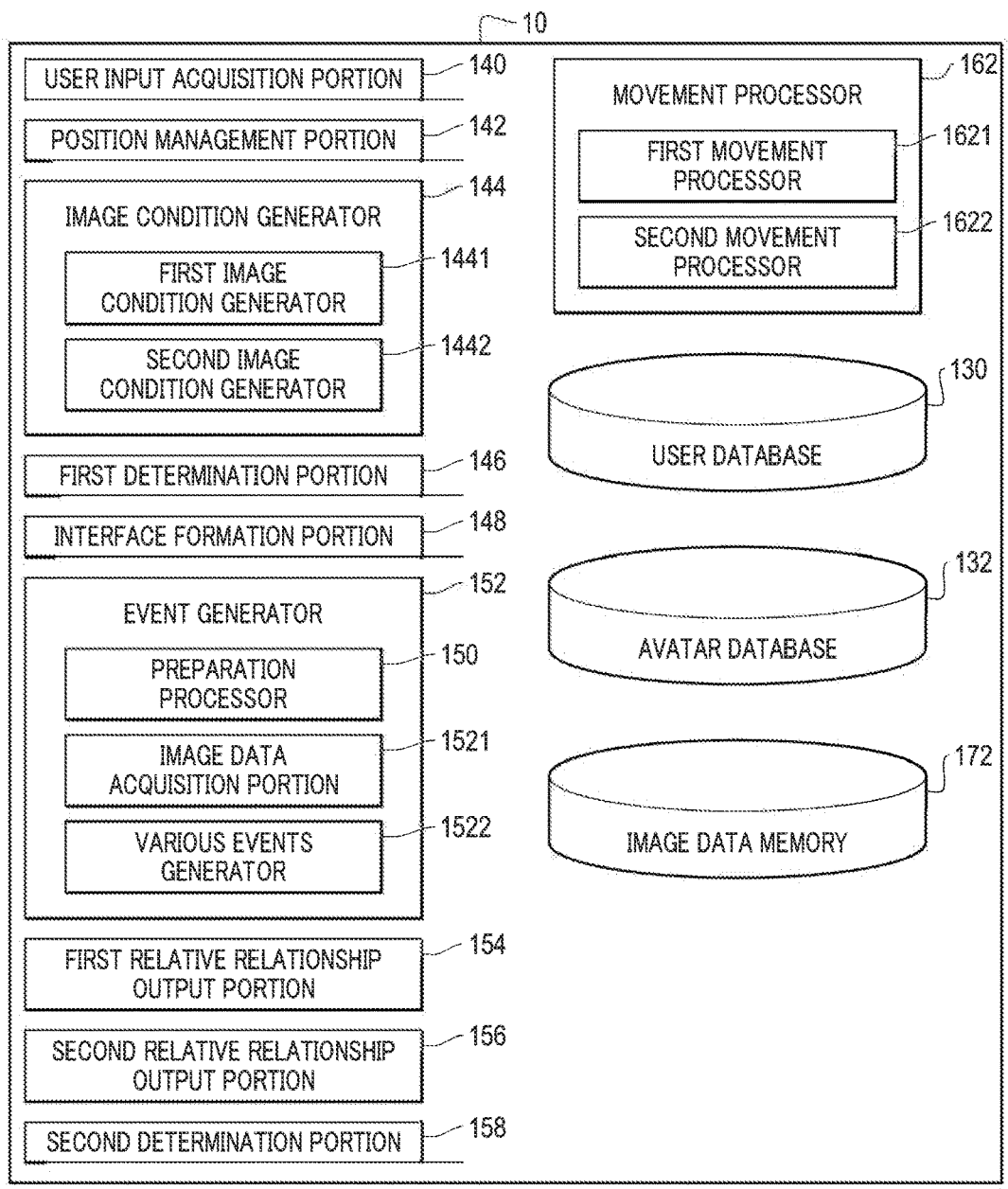
FIG. 11 is a functional block diagram of a server device related to an image acquisition event and an item acquisition event.
Figure 12:
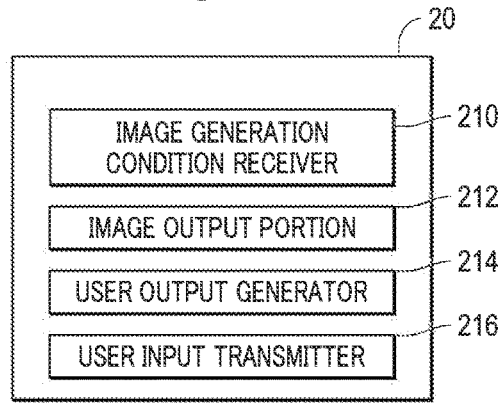
FIG. 12 is a function block diagram of a terminal device related to an image acquisition event and an item acquisition event.
Figures 13, 14, 15:
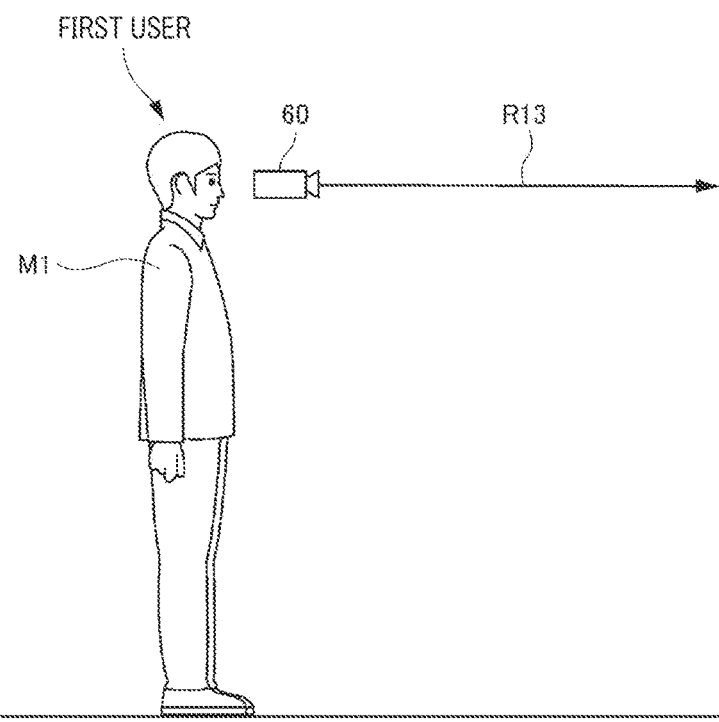
FIG. 13 is an explanatory diagram of data in a user database.
FIG. 14 is an explanatory diagram of data in an avatar database.
FIG. 15 is an explanatory diagram (part 1) of shooting arrangement processing.

FIG. 11 is an example of a functional block diagram of a server device 10 related to the image acquisition event and item acquisition event described above. FIG. 12 is an example of a functional block diagram of a terminal device 20 related to the image acquisition event and item acquisition event described above. FIG. 13 is an explanatory diagram of data in a user database 130. FIG. 14 is an explanatory diagram of data in an avatar database 132. In FIGS. 13 and 14, "***" represents a state in which some information is stored, "-" represents a state in which no information is stored, and " . . . " represents that the same thing is being repeated.

Here, the functions of the server device 10 are explained first, and then the functions of the terminal device 20 are explained.

(Functions of Server Device)

As shown in FIG. 11, the server device 10 has a user database 130, an avatar database 132, a user input acquisition portion 140 (an example of an input acquisition portion), a position management portion 142, an image condition generator 144, a first determination portion 146, an interface formation portion 148, a preparation processor 150, an event generator 152, a first relative relationship output portion 154, a second relative relationship output portion 156, a second determination portion 158, a movement processor 162, and an image data memory 172. Additionally, some or all of the functions of the server device 10 described below may be realized by the terminal device 20 as appropriate (see FIGS. 21, 21A, and 21B described hereafter). Furthermore, the classification of the devices ranging from the user input acquisition portion 140 to the movement processor 162 is for convenience of explanation, and some functional parts may realize the functions of other functional parts. This is also true for the classification of the user database 130, the avatar database 132, and the image data memory 172. For example, some or all of the data in the user database 130 may be integrated into the data in the avatar database 132 or may be stored in a separate database.

The devices ranging from the user input acquisition portion 140 to the movement processor 162 can be realized by executing one or more programs in the server memory 12 of the server device 10 by the server controller 13 of the server device 10. Additionally, the user database 130, the avatar database 132, and the image data memory 172 can be realized by the server memory 12 of the server device 10.

User information 600 is stored in the user database 130. In the example shown in FIG. 13, in the user information 600, each user ID is associated with a user name, user avatar ID, position/orientation information, and the like. The user name is a name registered by the user himself/herself and is arbitrary. The user avatar ID is an ID for specifying a user avatar. The position/orientation information includes position information and orientation information of the user avatar M1. The position information of the user avatar M1 may be managed in a coordinate system associated with a real space image. The orientation information may be information representing the orientation of the user avatar M1. The position/orientation information and the like are information that may dynamically change according to the operation input from the user. In addition to the position/orientation information, information representing the movement of the hands and feet of the user avatar M1 and information representing facial expressions and the like may also be included.

The avatar database 132 stores avatar information about the user avatar M1. In the example shown in FIG. 14, user avatar information 700 associates each user avatar ID with a face, hairstyle, clothes, and the like. Information related to appearance such as face, hairstyle, and clothes are parameters that characterize the user avatar, and may be set in advance or may be set by each user. For example, an ID may be assigned to each type of information related to the appearance of the avatar, such as the face, hairstyle, and clothing. Additionally, for the face, part IDs may be prepared for various categories such as the shape of the face, the eyes, the mouth, and the nose, and the information relating to the face may be managed by combining the IDs of the parts that make up the face. In this case, information related to appearance such as face, hairstyle, and clothing can function as avatar drawing information. That is, it is possible to draw each user avatar M1 not only on the server device 10 side but also on the terminal device 20 side, based on each ID related to the appearance linked to each user avatar ID.

Thus, in this embodiment, basically, one user is associated with one user ID, and one user ID is associated with a user avatar ID. Therefore, (i) a state in which certain information is associated with one user, (ii) a state in which the information is associated with the one user ID, and (iii) a state in which the information is associated with the user avatar ID associated with the one user ID are synonymous with each other. One user ID may be associated with two or more user avatar IDs.

The user input acquisition portion 140 acquires various inputs by each user input via the input portion 24 of the terminal device 20.

The position management portion 142 positions various display media among the virtual reality media in the virtual space when a predetermined arrangement condition is satisfied. The various display media may include a first user avatar M1 associated with the first user, a second user avatar M1 associated with the second user, and other display media (for example, the specific items described above).

When positioning one display medium in the virtual space, the position management portion 142 may set the position information of the one display medium in the above-described coordinate system associated with the real space image. That is, the position management portion 142 may manage the position information of various display media in the above-described coordinate system associated with the real space image.

A predetermined arrangement condition may be set for each display medium to be positioned. For example, the predetermined arrangement condition related to the first user avatar M1 may be input by the first user and may be satisfied when a request to enter the virtual space is made. In this case, the position information (initial position information) of the first user avatar M1 in the virtual space may be designated by the first user, or may be specified based on the position information of the first user in a real space. Similarly, the predetermined arrangement condition related to the second user avatar M1 may be input by the second user and may be satisfied when there is a request to enter the virtual space. In this case, the position information (initial position information) of the second user avatar M1 in the virtual space may be designated by the second user, or may be specified based on the position information of the second user in the real space. When the position information of each user in the real space is used in the arrangement processing by the position management portion 142, for example, when the first user and the second user are at substantially the same position in the real space, the first user avatar M1 and the second user avatar M1 are positioned at substantially the same position in the virtual space as well. Alternatively, in another embodiment, the position information (initial position information) of the user avatar M1 in the virtual space when positioned by the position management portion 142 may correspond to the position information of the same user avatar M1 at the previous exit.

Also, a predetermined arrangement condition for a specific item may be satisfied when a mission of a corresponding item acquisition event is set. The positions (initial position information) where various display media are positioned by the position management portion 142 in the virtual space may be defined in advance or randomly determined according to the attributes of the display media. For example, in the case of a specific item corresponding to an object in a real space, position information (initial position information) of the specific item in virtual space may correspond to position information of the same object in the real space. In addition, the predetermined arrangement condition for a specific item with a limited number of arrangements may include that the number of arrangements is less than the upper limit.

The position management portion 142 may virtually form separate virtual spaces for each group. That is, the position management portion 142 may position each user avatar M1 belonging to one group and each user avatar M1 belonging to another group in separate virtual spaces. In this case, the separate virtual spaces may be visually identical (that is, they may be spaces in which only the user avatars M1 being operated there are different).

The image condition generator 144 generates an image generation condition for the above-described terminal image for each user. The image generation condition may include, for example, the date and time, an ID associated with an imaged point (location ID described hereafter), camera parameters (azimuth, angle of attack, angle of view, and the like), ID of a user avatar to be drawn, the position of the user avatar to be drawn, and the like. Furthermore, the image generation condition may contain information showing the user avatar information 700 (see FIG. 14) to be drawn, the posture of the user avatar to be drawn, and the like. The image generation condition may also include information for drawing a user interface, which will be described hereafter, information for drawing the direction guide images G6161 and the distance guide images G6162, and the like.

The image condition generator 144 includes a first image condition generator 1441 and a second image condition generator 1442.

The first image condition generator 1441 generates an image generation condition for a terminal image (an example of a first display image) for the first user that is viewable by the first user. As described above, the terminal image for the first user may be viewable through the display portion 23 of the terminal device 20 by the first user.

The first image condition generator 1441 generates the image generation condition for the terminal image for the first user so that the terminal image for the first user is drawn based on a real space image, as described above. Specifically, based on the position information of the first user avatar M1 (see position/orientation information in FIG. 13), the first image condition generator 1441 generates an image generation condition for drawing a real space image for the terminal image for the first user using an API as described above.

In this case, the orientation from a first viewpoint for viewing the real space image may be determined according to the orientation of a first user avatar M1 (see position/orientation information in FIG. 13). The orientation of the first user avatar M1 may be the orientation of the first user avatar M1 as a whole, or the orientation of a specific part of the first user avatar M1 (for example, the orientation of the face, the orientation of the body, the orientation of the eyes), or the like.

Also, the first image condition generator 1441 generates an image generation condition for drawing a second user avatar M1 on the terminal image for the first user. In this case, according to the position information of the second user avatar M1 (see position/orientation information in FIG. 13), the first image condition generator 1441 may generate an image generation condition for drawing the second user avatar M1 on the terminal image for the first user. For example, if the position information of the second user avatar M1 belongs to a spatial portion indicated by the terminal image for the first user, the first image condition generator 1441 may generate an image generation condition for drawing the second user avatar M1 on the terminal image for the first user.

When generating the image generation condition for drawing the second user avatar M1, the first image condition generator 1441 may use the user avatar information 700 (see FIG. 14) associated with the corresponding user avatar ID in the avatar database 132. Also, at this time, an image generation condition for expressing the orientation of the second user avatar M1 may be generated, based on the position/orientation information of the corresponding user avatar ID in the user database 130.

Also, the first image condition generator 1441 generates an image generation condition for drawing a specific item on the terminal image for the first user. In this case, the first image condition generator 1441 may generate an image generation condition for drawing the specific item on the terminal image for the first user according to the position information of the specific item. For example, if the position information of the specific item belongs to a spatial portion indicated by the terminal image for the first user, the first image condition generator 1441 may generate an image generation condition for drawing the specific item on the terminal image for the first user.

Also, the first image condition generator 1441 generates an image generation condition for drawing a terminal image for the first user related to an image acquisition event. In this case, as described above with reference to FIG. 7, when it is determined that a first predetermined condition is satisfied, the first image condition generator 1441 cooperates with the preparation processor 150 to select each pose from multiple types of poses, and an image generation condition for drawing the first user avatar M1 and the second user avatar M1 in the selected poses is generated. If there is a plurality of second user avatars M1, the pose may be selected separately for each second user avatar M1. Multiple types of poses, such as poses that use fingers and hands in a V sign, poses that use the whole body such as jumping, and the like, are arbitrary. Also, the multiple types of poses may include types of facial expressions. The pose selection method and the like may be as described above.

When generating an image generation condition for drawing a terminal image for the first user related to the image acquisition event, the first image condition generator 1441 may (i) generate an image generation condition for drawing the first user avatar M1 so that the first user avatar M1 is positioned at the center of the terminal image for the first user, (ii) generate an image generation condition for drawing the first user avatar M1 so that the first user avatar M1 and the second user avatar(s) M1 are arranged in a randomly determined order, or (iii) generate an image generation condition for drawing the first user avatar M1 so that the first user avatar M1 and the second user avatar(s) M1 are arranged in a predetermined designated order. In this case, the first image condition generator 1441 may perform adjustment such as shifting the drawing position immediately in front of the second user avatar(s) M1 in the terminal image for the first user. Such an adjustment may be performed as part of the shooting arrangement processing, which will be described hereafter. Alternatively, the first image condition generator 1441 may generate an image generation condition for drawing the first user avatar M1 so as not to change (influence) the drawing position immediately in front of the second user avatar(s) M1 in the terminal image for the first user.

The second image condition generator 1442 generates an image generation condition for the terminal image for the second user that is viewable by the second user. As described above, the terminal image for the second user may be viewable through the display portion 23 of the terminal device 20 by the second user.

Similar to the first image condition generator 1441, the second image condition generator 1442 generates an image generation condition for the terminal image (an example of the second display image) for the second user so that the terminal image for the second user is drawn based on a real space image as described above. Specifically, the second image condition generator 1442 may acquire the image generation condition for drawing the real space image for the terminal image for the second user using an API as described above, based on the position information of the second user avatar M1 (see position/orientation information in FIG. 13). The second image condition generator 1442 generates the image generation condition for drawing a terminal image for the second user, based on a real space image viewed from a second viewpoint associated with the second user avatar M1. In this case, the orientation from the second viewpoint for viewing the real space image may be determined according to the orientation of the second user avatar M1 (see position/orientation information in FIG. 13). The orientation of the second user avatar M1 may be the orientation of the second user avatar M1 as a whole, or the orientation of a specific part of the second user avatar M1 (for example, the orientation of the face, the orientation of the body, the orientation of the eyes), or the like.

Additionally, the second image condition generator 1442 related to one second user generates an image generation condition for drawing the first user avatar M1 and another second user avatar M1 (second user avatar M1 associated with another second user different from the one second user) on the terminal image for the second user. In this case, according to the position information of the first user avatar M1 and other second user avatar M1 (see position/orientation information in FIG. 13), the second image condition generator 1442 may generate an image generation condition for drawing the first user avatar M1 and other second user avatar M1 on the terminal image for the second user.

Also, similar to the first image condition generator 1441, the second image condition generator 1442 generates an image generation condition for drawing a specific item on the terminal image for the second user. Additionally, similar to the first image condition generator 1441, the second image condition generator 1442 generates an image generation condition for drawing a terminal image for the second user related to the image acquisition event.

The first determination portion 146 determines whether a first predetermined condition is satisfied for each user. The first predetermined condition may be as described above. In this case, the first determination portion 146 may use the position information of the corresponding user avatars M1 in the user database 130 when determining whether the first predetermined condition is satisfied. In this case, the first determination portion 146 can calculate a relative positional relationship (first relative relationship described below) such as the distance between the user avatars M1 based on the position information of each user avatar M1.

Here, the position information of each user avatar M1 is initially determined by the position management portion 142 as described above, and then updated by the movement processor 162, which will be described hereafter. When the position information of each user avatar M1 is specified based on the position of each user in a real space as described above with respect to the position management portion 142 or as described hereafter with respect to the movement processor 162, the first predetermined condition will be determined based on the position of each user in the real space. For example, the first predetermined condition that is satisfied when the distance (relative distance in the virtual space) between the first user avatar M1 and the second user avatar M1 is within a predetermined distance may be satisfied when the distance between the same users in the real space is within a predetermined distance. Also, for example, the first predetermined condition that is satisfied when the position of the first user avatar M1 is within a predetermined distance with respect to a reference position (specific position) of the corresponding specific location may be satisfied when the same user position in the real space is within a predetermined distance with respect to the same specific position.

The interface formation portion 148 forms a user interface in the terminal image. The user interface may include the user interfaces G611 and G612 described above with reference to FIG. 6. Additionally, as described hereafter, the interface formation portion 148 cooperates with the preparation processor 150 to perform processing for activating the operation button B602 (see FIG. 6), which is the shutter button (making the operation button B602 operable).

The preparation processor 150 performs preparation processing for enabling a predetermined event to occur when the first determination portion 146 determines that the first predetermined condition is satisfied. The preparation processor 150 performs preparation processing for each user according to whether the first predetermined condition is satisfied for each user. For example, when it is determined that the first predetermined condition is satisfied with respect to the first user, preparation processing is performed to enable a predetermined event to occur with respect to the first user.

Preparation processing may differ for each predetermined event and may be omitted depending on the attributes of the predetermined event. For example, if a predetermined event is event E1 described above (the event of instantaneously moving to a common room or a specific position), preparation processing may be omitted, or it may be the process of generating or activating an instantaneous movement button.

In this embodiment, as described above, the predetermined event is the image acquisition event, and the preparation processing includes processing for activating the operation button B602 (see FIG. 6) (making the operation button B602 operable), which is the shutter button, as an interface for generating an image acquisition event. Preparation processing is performed on the terminal image for the user for which it is determined that the first predetermined condition is satisfied.

Specifically, when it is determined by the first determination portion 146 that the first predetermined condition is satisfied, the preparation processor 150 transitions the operation button B602 from the inactive state to the active state via the interface formation portion 148. In a modified example, when it is determined by the first determination portion 146 that the first predetermined condition is satisfied, the preparation processor 150 may transition the operation button B602 from the non-display state to the display state via the interface formation portion 148. Alternatively, in another modification, when it is determined by the first determination portion 146 that the first predetermined condition is satisfied, the preparation processor 150 may transition the function of the operation button B602 from a normal picture taking function to a commemorative picture taking function via the interface formation portion 148. At this time, the operation button B602 (see FIG. 6), which is the shutter button, may change its form to a "Like" button or a share button. In this case, the normal picture taking function may be a function of taking a picture without the first user avatar M1 being reflected (that is, a function of storing a terminal image for the first user), which will be described hereafter.

Furthermore, as still another modification, the determination by the first determination portion 146 of whether the first predetermined condition is satisfied and the preparation processing related to the operation button B602 by the preparation processor 150 may be omitted. In this case, the operation button B602 may basically be activated at all times. When the operation button B602 is pressed, even if the first predetermined condition is not satisfied, a commemorative picture (shooting of a two shot picture) of the user avatars M1 who are within a range that can be captured as a terminal image can be taken. The omission of the determination by the first determination portion 146 and the omission of the preparation processing by the preparation processor 150 can be performed, for example, as the operation button B602 is constantly activated, by processing without going through the first determination portion 146 and the preparation processor 150, or by canceling or disabling the first predetermined condition even if the processing goes through the first determination portion 146 and the preparation processor 150. Furthermore, the omission of the determination by the first determination portion 146 and the omission of the preparation processing by the preparation processor 150 can also be adopted in other embodiments disclosed in this specification (including a case where the determination by the second determination portion 158 described hereafter is omitted).

Additionally, in this embodiment, as described above, the predetermined event is an image acquisition event, and the preparation processing may further include a process of drawing each user avatar M1 in a drawing mode that will serve as commemorative picture taking.

Specifically, when it is determined by the first determination portion 146 that the first predetermined condition is satisfied for the first user, the preparation processor 150 generates, via the first image condition generator 1441, an image generation condition for drawing a terminal image for the first user so that each of the first user avatar M1 and the second user avatar M1 is included in the terminal image for the first user. Hereinafter, among the preparation processes executed by the preparation processor 150, the drawing preparation processing executed in cooperation with the first image condition generator 1441 is also referred to as "shooting arrangement processing."

At the image acquisition event, the processing for generating an image generation condition for drawing the first user avatar M1 and the second user avatar M1 in the poses selected by the first image condition generator 1441 may be executed after the shooting arrangement processing described above, or may be realized substantially simultaneously with the shooting arrangement processing. In other words, the shooting arrangement processing may be executed simultaneously in conjunction with the image acquisition event, or may be executed in synchronization with the process of activating the operation button B602 (see FIG. 6), which is the shutter button (making the operation button B602 operable).

Similarly, when it is determined by the first determination portion 146 that the first predetermined condition is satisfied for the second user, the preparation processor 150 generates, via the first image condition generator 1441, an image generation condition for drawing a terminal image for the second user so that each of the other user avatars M1 that satisfy the first predetermined condition is included in the terminal image for the second user together with the second user avatar M1.

Here, the shooting arrangement processing will be described with reference to FIGS. 15 and 16. The first image condition generator 1441 will be described here, but the same applies to the second image condition generator 1442.

Figure 16:
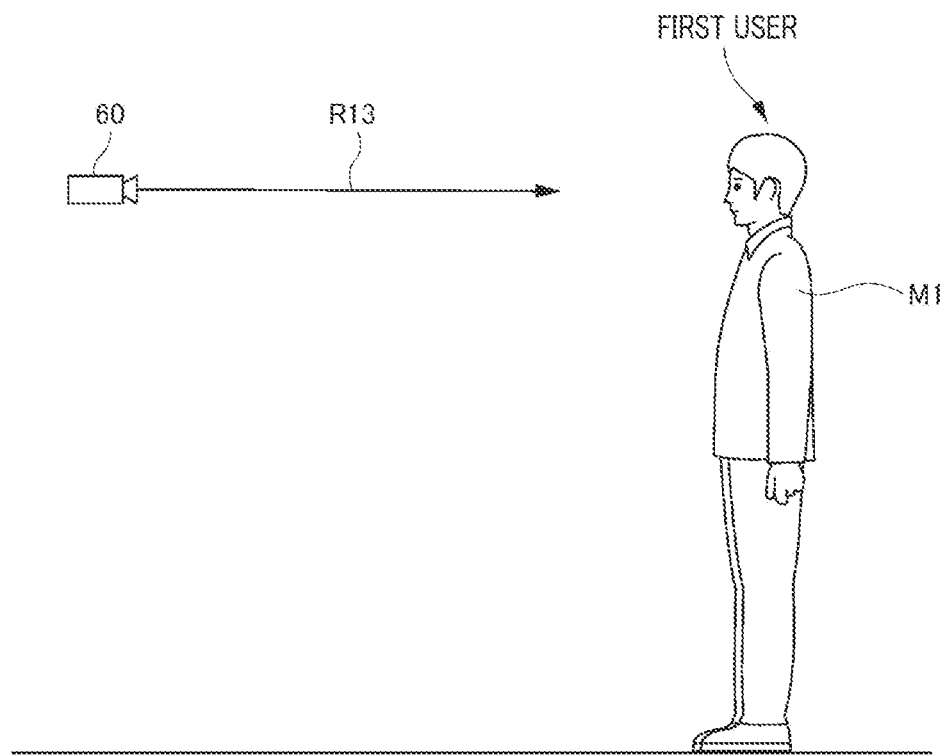
FIG. 16 is an explanatory diagram (part 2) of the shooting arrangement processing.

FIGS. 15 and 16 schematically show the first user avatar M1 (the user avatar M1 associated with the first user) and a virtual camera 60 in the virtual space as viewed from the side. An arrow R13 from the virtual camera 60 represents a line-of-sight direction from the first viewpoint related to the terminal image for the first user. FIG. 15 shows a state before the image acquisition event described above, and FIG. 16 shows a state at the time of the image acquisition event described above. In the state at the time of the image acquisition event, a second user avatar M1 is positioned beside the first user avatar M1, but illustration of the second user avatar M1 is omitted in FIG. 16.

Here, the virtual camera 60 is used for explanation. The position of the virtual camera 60 corresponds to the first viewpoint related to the terminal image for the first user, and the line-of-sight direction of the virtual camera 60 (the direction of the arrow R13) shows the line-of-sight direction (direction of viewing the real space image) from the first viewpoint when generating the terminal image for the first user.

The state shown in FIG. 15 is the state before the image acquisition event and the state before shooting arrangement processing is executed. In this case, the first user avatar M1 is positioned behind the virtual camera 60, for example, the virtual camera 60 is positioned in front of the first user avatar M1 (for example, in front of the eyes). At this time, the line-of-sight direction of the virtual camera 60 corresponds to the orientation of the first user avatar M1. In this case, the terminal image for the first user is a first-person viewpoint image, and the first user avatar M1 itself is not drawn as an avatar (a form other than the image G610). However, in the terminal image for the first user, an image generation condition may be generated such that a part of the body such as the hand of the first user avatar M1 is drawn. For example, when the first user puts his or her left hand out in front of the eyes, the terminal image for the first user may include the left hand of the first user avatar M1.

The state shown in FIG. 16 is the state at the time of the image acquisition event, and is the state after the shooting arrangement processing is executed. In this case, the first user avatar M1 is positioned in front of the virtual camera 60. At this time, the line-of-sight direction of the virtual camera 60 corresponds to the orientation toward the first user avatar M1. In other words, the first user avatar M1 moves within the field of view of virtual camera 60.

The shooting arrangement processing thus includes substantially changing the position of the user avatar M1 so that the user avatar M1 is included in the terminal image for the first user. However, the actual process may be a process of generating an image generation condition for additionally drawing the user avatar M1 on the terminal image for the first user without changing the position information of the user avatar M1 itself.

The event generator 152 includes an image data acquisition portion 1521 and a various events generator 1522.

The image data acquisition portion 1521 generates an image acquisition event. In this embodiment, when the first predetermined condition described above is satisfied and an operation input of the operation button B602 (an example of a predetermined input) by the first user is acquired, the image data acquisition portion 1521 generates an image acquisition event. In a modified example, when the first predetermined condition described above is satisfied, the image data acquisition portion 1521 may automatically (irrespective of the operation input of the operation button B602 by the first user) generate an image acquisition event. Alternatively, when the first predetermined condition described above is satisfied, another arbitrary condition is satisfied, and the operation input of the operation button B602 by the first user is acquired, the image data acquisition portion 1521 may generate an image acquisition event. Also, other input (including voice input, or the like) may be used instead of or in addition to the operation input of the operation button B602.

Based on the image generation condition for the terminal image for the first user (terminal image in which the first user avatar M1 and the second user avatar M1 are drawn) generated by the first image condition generator 1441 at the time of the image acquisition event for the first user, the image data acquisition portion 1521 acquires an image generation condition (an example of an image generation condition for specific image data) related to event image data (an example of specific image data). The event image data may be data of the image generation condition itself for the terminal image for the first user generated by the first image condition generator 1441 at the time of the image acquisition event for the first user. It may also be image data processed for such an image generation condition (for example, compressed data, or data from which the user interface or a part of the display medium has been removed). Also, regarding the image generation condition related to event image data, additional information selected by the user or predetermined additional information (the name of the place, the time when the picture was taken, the picture of a frame, or the like) may be added to the image generation condition for the terminal image for the first user generated by the first image condition generator 1441.

The image generation condition related to event image data is an image generation condition for generating an image related to the event image data. The image generation condition related to the event image data may include, for example, the date and time when the image was captured, the name of an imaged phase, an ID associated with the location where the image was captured (location ID described hereafter), and camera parameters (azimuth, angle of attack, angle of view, and the like). Also, the phase name may be used for printing a watermark. Furthermore, the image generation condition related to the event image data may include user avatar information 700 (see FIG. 14) to be drawn and information indicating the type of pose at the time of imaging.

For example, in the example described with reference to FIG. 8, the image data acquisition portion 1521 synchronizes with the output of "Say cheese!" or a shutter sound, and acquires the image generation condition related to the event image data, based on the terminal image for the first user at or before/after that timing. In a modified example, the image data acquisition portion 1521 may acquire the event image data itself.

The image data acquisition portion 1521 functions for each user. That is, in the case of the second user(s) as well, based on the image generation condition related to the terminal image for the second user generated by the second image condition generator 1442 at the time of the image acquisition event related to the second user, the image data acquisition portion 1521 acquires the image generation condition related to the event image data.

The various events generator 1522 generates various events in the virtual space. The various events may be events other than the above-described predetermined events, and may be, for example, the above-described item acquisition events, missions related to various events, and the like. For example, the various events generator 1522 associates a specific item or a corresponding virtual reality medium with a user who satisfies the second predetermined condition in the item acquisition event described above.

Based on a relative positional relationship (hereinafter also referred to as "first relative positional relationship") between the first user avatar M1 and the second user avatar(s) M1 in the virtual space, the first relative relationship output portion 154 outputs first relative relationship information representing or suggesting the first relative positional relationship. The first relative relationship information may be output via the terminal image. That is, the first relative relationship information may be in the form of an image included in the terminal image.

The relative positional relationship between the first user avatar M1 and the second user avatar(s) M1 in the virtual space is a concept including relative distance, relative orientation, and the like. In this embodiment, the first relative relationship information includes the direction guide image(s) G6161 and the distance guide image(s) G6162 as described above with reference to FIG. 6. However, in a modified example, the first relative relationship information may include either one of the direction guide image(s) G6161 and the distance guide image(s) G6162.

Figure 17:
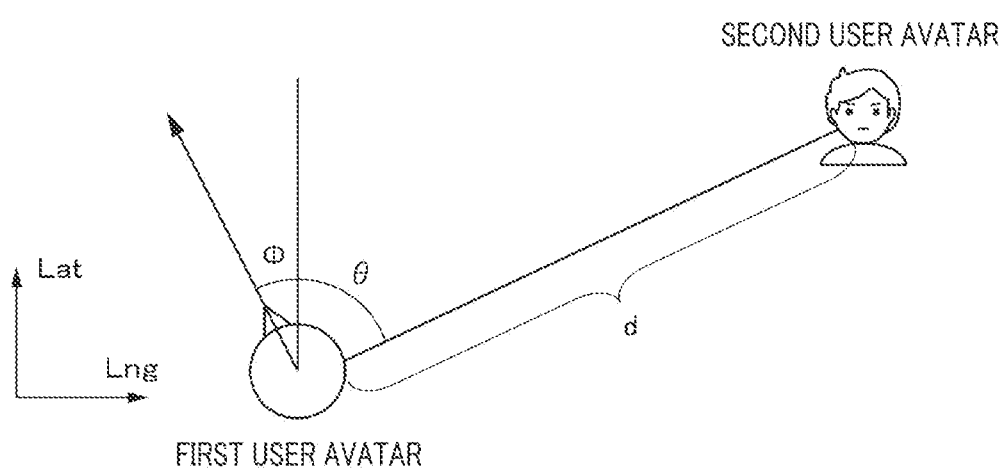
FIG. 17 is an explanatory diagram (part 1) of a method for calculating a first relative positional relationship.
Figure 18:
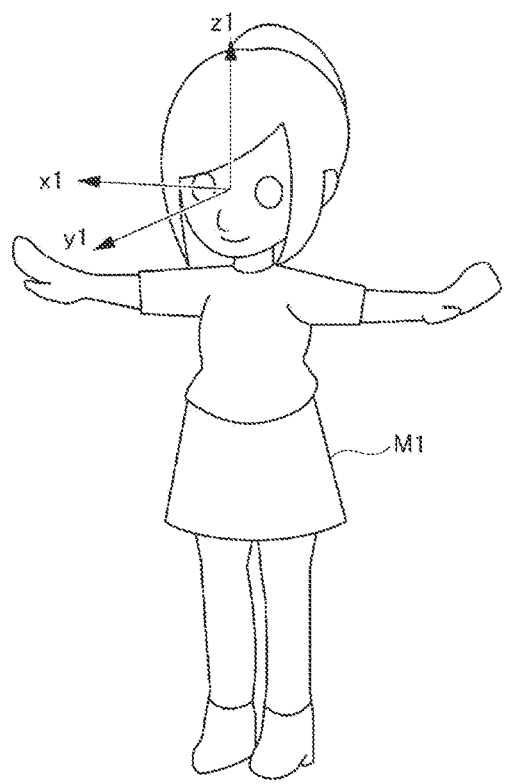
FIG. 18 is an explanatory diagram (part 2) of the method for calculating a first relative positional relationship.

Here, an example of a method for calculating the first relative positional relationship will be described with reference to FIGS. 17 and 18. FIG. 17 schematically shows the first user avatar M1 and the second user avatar M1 in plan view (bird's eye view). FIG. 18 shows a local coordinate system (x1 axis, y1 axis, z1 axis) related to the orientation of face parts as an explanatory diagram of the orientation $\phi$ of the first user avatar M1.

In this embodiment, the direction a related to the direction guide image G6161 may be calculated based on the following calculation formula, for example.

$$\alpha = \phi + \theta \qquad \text{[Formula 1]}$$

Here, (Latp, Lngp) is position information (latitude, longitude) of the first user avatar M1, and (Latt, Lngt) is position information (latitude, longitude) of the second user avatar M1 in the coordinate system associated with the real space image. FIG. 17 schematically shows the distance d related to the distance guide image G6162. The distance d may be the Euclidean distance between the position information (Latp, Lngp) and the position information (Latt, Lngt). The distance d may be used for determination by the first determination portion 146 described above.

Also, the orientation ϕ of the first user avatar M1 may be defined by rotation angles around the x1 axis, the y1 axis, and the z1 axis as the orientation of the face part. A variable range of the rotation angle around each of the x1-axis, y1-axis and z1-axis may be set according to the attribute of a specific part. Alternatively, as described above, the orientation ϕ of the first user avatar M1 may be calculated based on the direction of another part (for example, eye direction, that is, line-of-sight direction).

Based on the relative positional relationship between the first user avatar M1 and the specific item in the virtual space (hereinafter also referred to as "second relative positional relationship"), the second relative relationship output portion 156 outputs second relative relationship information representing or suggesting a second relative positional relationship. The second relative relationship information may be output via the terminal image. That is, the second relative relationship information may be in the form of an image included in the terminal image.

The relative positional relationship between the first user avatar M1 and the specific item in the virtual space is a concept including relative distance, relative orientation, and the like. In this embodiment, the second relative relationship information includes the direction guide image G614 and the distance guide image G615 as described above with reference to FIG. 6. However, in a modified example, the second relative relationship information may include either one of the direction guide image G614 and the distance guide image G615. A method of calculating the direction and distance related to the direction guide image G614 and the distance guide image G615 may be the same as the method of calculating the first relative positional relationship described above with reference to FIGS. 17 and 18.

The second determination portion 158 determines whether the second predetermined condition is satisfied for each user. The second predetermined condition may be as described above. In this case, the second determination portion 158 may use the position information of the corresponding user avatar M1 in the user database 130 when determining whether the second predetermined condition is satisfied. In this case, based on the position information of each user avatar M1 and the position information (already known) of the specific item, the first determination portion 146 can calculate the second relative positional relationship.

The movement processor 162 changes the position and orientation of each user avatar M1 based on various inputs from each user. The user's input for changing the position and orientation of the user avatar M1 may vary and may differ for each terminal device 20. The position information of the user avatar M1 related to one user may be changed by an operation input of a physical switch such as specific keys (for example, the "WASD" keys) or may be modified by input indicating the movement of the one user based on motion capture technology. Furthermore, the position information of the user avatar M1 related to one user may be identified based on the position of the one user in a real space. For example, when the first user and the second user are located at the same position in the real space, the position information of the first user avatar M1 and the position information of the second user avatar M1 may be set to be the same. Hereinafter, the user input for changing the position information of the user avatar M1 is also referred to as "movement operation input," and the user input for changing the orientation information of the user avatar M1 is also referred to as "direction operation input."

The movement processor 162 includes a first movement processor 1621 that performs processing related to movement of the first user avatar M1 and a second movement processor 1622 that performs processing related to movement of the second user avatar M1. Since the first movement processor 1621 and the second movement processor 1622 have substantially the same functions except for the user avatar M1 to be processed, the first movement processor 1621 will be mainly described below. Therefore, in the following description, for the second movement processor 1622, if "the first" is read as "the second," it is substantially valid.

Based on the movement operation input (an example of the first input) and direction operation input from the first user acquired by the user input acquisition portion 140, the first movement processor 1621 changes position information and orientation information of the first user avatar M1 in the virtual space. In this embodiment, as an example, the position information and orientation information of the first user avatar M1 in the virtual space are managed in a coordinate system associated with the real space image forming the terminal image. The position information of the first user avatar M1 in the virtual space basically corresponds to the drawing position of the first user avatar M1 in the image generation condition for the terminal image generated by the first image condition generator 1441, but it does not have to match all the time. For example, as in the case of the shooting arrangement processing described above, an image generation condition may be generated such that the drawing position of the first user avatar M1 in the terminal image changes without changing the position information of the first user avatar M1. This also applies to orientation information.

The first movement processor 1621 may freely (without limitation) change the position information of first user avatar M1 in the virtual space based on movement operation input from the first user. However, preferably, the position information of the first user avatar M1 may be changed under a predetermined restricted condition. The predetermined restricted condition is arbitrary, but may be set, for example, to prohibit movement that is clearly contrary to physical phenomena in real space (for example, movement that penetrates the walls of a building).

Additionally, the first movement processor 1621 may change or eliminate the predetermined restricted condition according to the mode or the like that can be set by the administrative user who manages the virtual space. For example, when a mode is set that is an exploration mode, the predetermined restricted condition may be substantially eliminated or significantly relaxed.

In this embodiment, an administrative user who manages the virtual space can set various modes, and the various modes include various mission modes. The various mission modes may include a mission mode in which a player(s) searches for and obtains the specific item described above, a mission mode in which the player(s) moves to a specific location, and the like. In this embodiment, the various mission modes are mission modes for specific experiences and learning, and include a mission mode that increases the depth of experience and learning by clearing multiple challenges (sub-missions) in order (hereinafter referred to as a "progressive mission mode").

Figure 19:
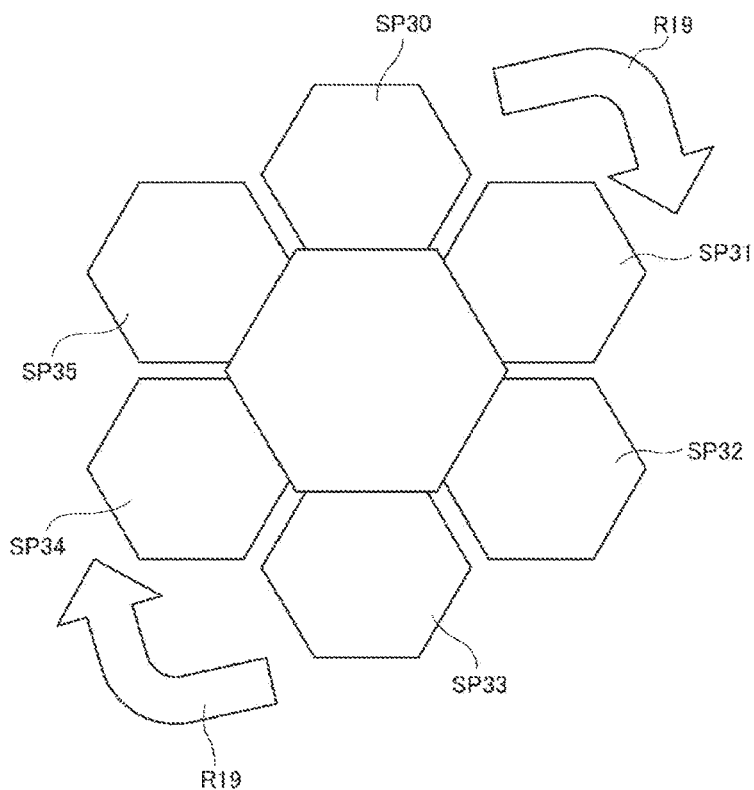
FIG. 19 is an explanatory diagram of a progressive mission mode.

FIG. 19 is an explanatory diagram of the progressive mission mode. In FIG. 19, each spatial portion within the virtual space is conceptually schematically shown as a hexagonal area. Each of the spatial portions SP30 to SP35 is associated with a corresponding assignment (sub-mission).

In this case, the user can increase the depth of experience and learning by clearing a plurality of tasks (sub-missions) in order by going around the spatial portions SP30 to SP35 clockwise (see arrow R19). In this case, in one spatial portion (an example of the first area) that is any one of the spatial portions SP30 to SP34, when the task (an example of the first movement condition) associated with each spatial portion is cleared by the first user, the first movement processor 1621 may allow the first user avatar M1 to move to the next spatial portion (an example of the second area). Alternatively, movement to the next spatial portion may be in the form of a forced movement or may be realized in response to an instruction from a user who is allowed to move.

In the example shown in FIG. 19, as an example, although a conceptually orbital progressive mission mode is shown, the progressive mission mode is not limited to orbital, and may be realized in various modes such as so-called "sugoroku."

For example, a progressive mission mode for travel to France may include sub-missions analogous to actual activities, such as a sub-mission to travel to Haneda Airport, a sub-mission to exchange money at Haneda Airport, a sub-mission to check-in at the check-in counter, a sub-mission to go through baggage check, a sub-mission to go through customs/immigration, a sub-mission to board the plane, and a sub-mission to complete immigration procedures in France. In this case, the sub-missions can be prepared in advance, so that this can be useful as an advance experience for children traveling abroad for the first time. It can also be used to confirm meeting places in advance for school trips, company trips, and the like. It can also be used as a pre-learning for various actions such as (i) meeting up at a station with a complex structure like a huge station, (ii) acting alone, (iii) acting freely in a group, and the like.

Additionally, the first movement processor 1621 moves the first user avatar M1 to a corresponding location based on the movement operation input associated with the instantaneous movement buttons B605 to B609 described above with reference to FIG. 6. Furthermore, when realizing the above-described event E1 (event of instantaneously moving to a common room or a specific position), the first movement processor 1621 may realize the same instantaneous movement.

Incidentally, if the virtual space is close to the real space by using real space images as in this embodiment, the range of activities (activity range) of each user avatar M1 can be relatively wide. Therefore, when a plurality of user avatars M1 engage in group activities (collective action) under a certain rule, there is a risk of loss of control. In particular, when a mode such as the exploration mode is set mode, each user avatar M1 can move freely to various locations, which may make it difficult for them to act in a controlled manner (for example, gathering).

Therefore, in this embodiment, based on a gathering instruction input (an example of a third input) from the administrative user managing the virtual space or a specified user of that kind (an example of a predetermined user), the movement processor 162 may move each user avatar M1 to a position corresponding to the gathering instruction input. In this case, the specified user may be a user who has received instructions from the managing user. For example, when the progressive mission mode is set for a plurality of users who are students, the specific user may be a user who manages the students. In this case, the specific user may be pre-registered.

The position corresponding to the gathering instruction input may be a predefined position. In this case, a plurality of pre-defined positions may be prepared, and each position may be the closest position for each user avatar M1. The pre-defined positions may also be specified in advance by a specific user, or the like. The gathering instruction input may also include position information that specifies a location corresponding to the gathering instruction input.

The user avatars M1 to be moved by the movement processor 162 may be each user avatar M1 in the same group, or may be limited to some user avatars M1 in the same group.

When a gathering instruction input from a specific user is acquired by the user input acquisition portion 140, the movement processor 162 may forcibly move each user avatar M1 to a location (for example, a gathering location) corresponding to the gathering instruction input. Alternatively, the movement processor 162 may move each user avatar M1 to the location corresponding to the gathering instruction input based on a response input (approval input) from each user. In this case, the user may reject the request, allowing for a highly flexible configuration. Multiple types of gathering instruction inputs may be provided, including a forcible gathering instruction input and a rejectable gathering instruction input. The instruction content pertaining to the gathering instruction input from a specific user may be communicated in the form of a sound, message, or the like prior to the forcible movement.

Figures 20, 21:
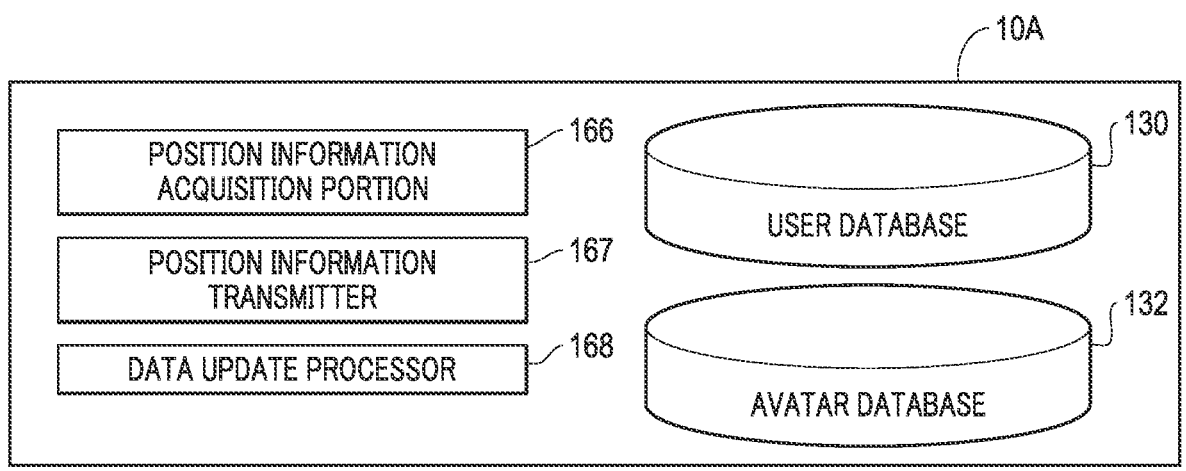
FIG. 20 is an explanatory diagram of an image generation condition related to event image data stored in an image data memory.
FIG. 21 is a functional block diagram of an example of a server device with different sharing modes.

The image data memory 172 stores the image generation condition pertaining to the event image data acquired by the image data acquisition portion 1521 described above. The image data memory 172 may be provided with a storage area for each user, and in this case, the image generation condition pertaining to the event image data acquired by the image data acquisition portion 1521 for each user is stored for each user. FIG. 20 is an explanatory diagram of image generation conditions pertaining to the event image data stored in the image data memory 172. FIG. 20 relates to the image generation conditions pertaining to the event image data for the first user. In the example shown in FIG. 20, each image generation condition pertaining to event image data is assigned a location ID, and for each location ID, a camera parameters, avatar information, position information, and date/time information are included. In this case, a URL (Uniform Resource Locator) may be issued for each location ID that contains a camera parameters, avatar information, position information, and date/time information. When storing an image generation condition pertaining to event image data, storage capacity can be made more efficient than when storing the event image data. In a modified example, instead of storing the image generation condition pertaining to the event image data, the event image data itself may be stored. In addition, position information of images, avatar information, and the like is stored and may be used as a condition to determine whether a mission is accomplished by one or more avatars. For example, the mission may be a mission to go to a specific position as a group. When the group members reach the specific position, they take a picture (image) together. Based on the position information of the image and the avatar information, it is determined that the mission has been accomplished. The picture (image) will serve as evidence that the mission has been accomplished.

The location ID is an identifier assigned to each image acquisition event. The camera parameters are information about the first viewpoint during the image acquisition event, which may include, for example, azimuth angle, angle of attack, angle of view, and the like. Avatar information is information about the second user avatar M1 to be drawn in the corresponding event image data. The position information is the position information of the real space image pertaining to the acquired event image data. The date and time information represents the date and time of the acquisition of the corresponding event image data.

Access to the image generation condition related to the event image data in the storage area for the first user may be permitted only for the first user. Alternatively, a second user in the same group may also have access, or another user(s) may also have access. An access right to the image generation condition related to the event image data in the storage area for the first user may be appropriately set by the first user. Also, the access right may be set for each event image data. In addition, an image taken with other avatars may be automatically shared with the other avatars. Alternatively, the image taken with other avatars may be shared with the other avatars based on an operation or selection by the first user.

In this embodiment, the image data memory 172 stores the image generation condition pertaining to the event image data acquired by the image data acquisition portion 1521. In addition to this, image data acquired at another timing, or the image generation condition thereof, may also be stored.

Access to the image generation condition pertaining to the event image data may be access for drawing (reproducing) an image pertaining to the event image data. In this case, for example, on a picture reproduction page, the user can view the image(s) pertaining to the event image data based on the accessed image generation condition. In this case, on the picture reproduction page, an image output portion 212 described below parses an image generation condition obtained by the access and stores the image generation condition in a variable as a query parameter, inputs the image generation condition as an argument to the "Google Maps API" provided by Google Inc. or a similar API method, selects avatar information, and the like to realize generation (reproduction) of an image related to event image data.

(Functions of Terminal Device)

As shown in FIG. 12, the terminal device 20 includes an image generation condition receiver 210, an image output portion 212, a user input generator 214, and a user input transmitter 216.

The image condition receiver 210 receives the image generation condition for the terminal image generated by the image condition generator 144 of the server device 10 described above.

The image output portion 212 draws a terminal image based on the image generation condition(s) for the terminal image received by the image generation condition receiver 210 and outputs the drawn terminal image on the display portion 23 described above. For example, the image output portion 212 may parse the image generation condition for the terminal image as a query parameter, store the image generation condition in a variable, input the image generation condition as an argument to the "Google Maps API" provided by Google Inc. or a similar API method, select avatar information, and the like, so as to draw the terminal image. The image data (HTML document+image) may be generated by the server device 10 based on the image generation condition, and the terminal device 20 may draw, on the display portion 23, a display screen that includes a captured image based on the image data (HTML document+image) received from the server device 10, without drawing the image directly from the image generation condition itself.

The user input generator 214 generates signals corresponding to various inputs input via the input portion 24 described above.

The user input transmitter 216 transmits, to the server device 10, the signals received by the user input generator 214. In this case, the server device 10 acquires various inputs by the corresponding user by receiving such signals.

Incidentally, the sharing of functions between the server device 10 and the terminal device 20 described above is only an example and can be modified in various ways as described above. That is, part or all of the functions of the server device 10 may be realized by the terminal device 20 as appropriate.

Figure 21A:
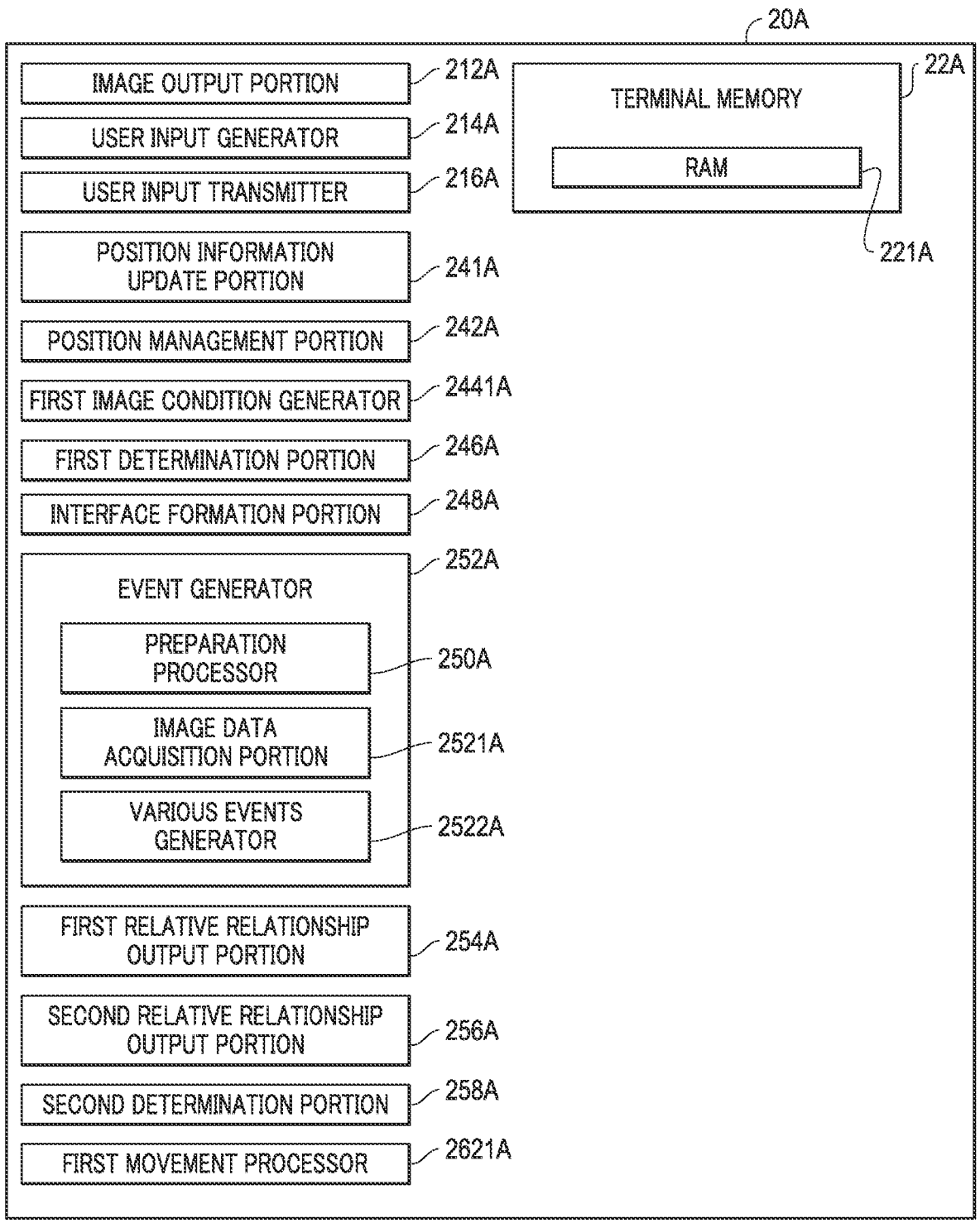
FIG. 21A is a functional block diagram of an example of a terminal device with different sharing modes.

For example, the sharing arrangements shown in FIGS. 21 and 21A may be realized. In this case as well, the server device 10A and each user's terminal device 20A cooperate with each other, and the same functionality can be achieved as in the case of cooperation between the server device 10 and the terminal device 20 described above. In the case of the sharing arrangements shown in FIGS. 21 and 21A, each function of the first determination portion 146, the first image condition generator 1441 of the image condition generator 144, the event generator 152, the first relative relationship output portion 154, and the first movement processor 1621 of the movement processor 162 can be performed by the respective browsers in the terminal devices 20A, as explained below.

In the terminal device 20A as shown in FIG. 21A, for example, when the operation button B602 (see FIG. 6), which is the shutter button, is pressed, it is possible to generate and transmit to the server device 10 the image generation condition at that time, to draw an image for the terminal image pertaining to a picture (for example, a picture or video taken during commemorative picture taking) using data such as avatar position information already received from the server device 10, and the like.

In the example shown in FIG. 21, the server device 10A includes a user database 130, an avatar database 132, a position information acquisition portion 166, a position information transmitter 167, and a data update processor 168. The position information acquisition portion 166, the position information transmitter 167, and the data update processor 168 can be realized by the server controller (see the server controller 13 in FIG. 1) of the server device 10A executing one or more programs in the server memory (see the server memory 12 in FIG. 1) of the server device 10A.

The position information acquisition portion 166 acquires the position/orientation information of each user avatar M1 by receiving the position/orientation information of each user avatar M1 from each terminal device 20. When the position information acquisition portion 166 obtains the position/orientation of each user avatar M1, the stored data in the user database 130 is updated. As shown in FIG. 13, in the user database 130, position/orientation information for each user avatar ID may be stored.

The position information transmitter 167 transmits, to the terminal devices 20A that are the subjects of transmission, the position/orientation information of the user avatars M1 in the user database 130. The terminal devices 20A that are the subjects of transmission of the position/orientation information of one user avatar M1 include the terminal device 20A of the user pertaining to another user avatar M1 belonging to the same group as the one user avatar M1. Thereby, the terminal device 20A associated with each user in the same group can obtain the position/orientation information of each user avatar M1 for another user. In this case, the position/orientation information of an unnecessary user avatar(s) M1 that is not to be drawn is not transmitted, and the communication load can be reduced.

The data update processor 168 transmits updated data to the terminal device 20A of each user, based on the data in the user database 130 and the avatar database 132. The transmission timing of the updated data may be set as appropriate, and may include timing corresponding to a request from the terminal device 20A.

The terminal device 20A shown in FIG. 21A is suitable when the virtual reality application is in the form of a Web application that can be used on a browser. The terminal device 20A includes an image output portion 212A, a user input generator 214A, and a user input transmitter 216A. Referring to FIG. 12, the image output portion 212A, the user input generator 214A, and the user input transmitter 216A may be substantially the same as the image output portion 212, the user input generator 214, and the user input transmitter 216 described above. Based on the image generation condition for the terminal image generated by the first image condition generator 2441A, which will be described hereafter, the image output portion 212A draws a terminal image and outputs the drawn terminal image on the display portion 23 described above.

Furthermore, in the example shown in FIG. 21A, the terminal device 20A includes a position information update portion 241A, a position management portion 242A, a first image condition generator 2441A, a first movement processor 2621A, a first determination portion 246A, an interface formation portion 248A, a preparation processor 250A, an event generator 252A, a first relative relationship output portion 254A, a second relative relationship output portion 256A, a second determination portion 258A, and a terminal memory 22A.

Hereinafter, the terminal device 20A pertaining to the first user is described, but the same is substantially true for the terminal device 20A pertaining to the second user.

Each portion from the position information update portion 241A to the second determination portion 258A can be realized by the terminal controller (see the terminal controller 25 in FIG. 1) of the terminal device 20A executing the virtual reality application according to this embodiment, which is a program in the terminal memory (see the terminal memory 22 in FIG. 1) of the terminal device 20A. Additionally, temporary storage of various data required in the terminal device 20A can be realized by RAM (Random Access Memory) 221A of the terminal memory 22A. In the RAM 221A, various data are expanded as a temporary memory function(s). For example, based on an HTML document created in the server device 10A, various data are downloaded, and data is temporarily developed in the RAM 221A and used for processing (drawing and the like) in the browser. When the browser is closed, the data developed in RAM 221A is erased.

In the RAM 221A, of the data (see FIG. 13) in the user database 130 of the server device 10 described above, only data relating to each user avatar M1 belonging to the same group as the first user avatar M1 may be stored, or other data may be further stored. Of the data in the RAM 221A, the position/orientation information data is updated by the position information update portion 241A based on the position/orientation information transmitted from the server device 10A. Other data in the RAM 221A may be updated as appropriate based on the updated data described above via communication with the server device 10A (for example, activation of the virtual reality application according to this embodiment, and the like).

Of the data (See FIG. 14) in the avatar database 132 of the server device 10 described above, the RAM 221A may store only data related to each user avatar M1 belonging to the same group as the first user avatar M1, or may further store other data. The data in the RAM 221A may be updated based on the above-described updated data via communication with the server device 10A when the virtual reality application (e.g., Web application) is activated.

The position information update portion 241A updates the position/orientation information data, among the data in the RAM 221A based on the data received from the server device 10A, as described above. Further, the position information update portion 241A may update the position/orientation information data related to the first user, among the data in the RAM 221A, based on movement operation input or direction operation input from the first user.

The position management portion 242A realizes the same function as the position management portion 142 of the server device 10 described above. However, the arrangement of each user avatar M1 may be performed only for the user avatar(s) M1 in the same group as the first user avatar M1, or may be performed for another user avatar(s) M1.

The first image condition generator 2441A realizes the same function as the first image condition generator 1441 of the server device 10 described above. The first image condition generator 2441A may transmit, to the server device 10A, the generated image generation condition. In this case, the image generation condition can also be stored at the server device 10A side.

The first movement processor 2621A realizes the same function as the first movement processor 1621 of the server device 10 described above.

The first determination portion 246A realizes the same function as the first determination portion 146 of the server device 10 described above. However, the first determination portion 246A determines, with respect to the first user avatar M1, whether the first predetermined condition is satisfied.

The interface formation portion 248A realizes the same function as the interface formation portion 148 of the server device 10 described above. However, the interface formation portion 148 performs processing related to the terminal image(s) for the first user.

The preparation processor 250A realizes the same function as the preparation processor 150 of the server device 10 described above. However, the preparation processor 250A performs the preparation processing described above for the first user avatar M1 (that is, based on the determination result by the first determination portion 246A) when the first predetermined condition is satisfied.

The event generator 252A realizes the same function as the event generator 152 of the server device 10 described above. However, the event generator 252A generates an event for first user avatar M1. The event generator 252A includes an image data acquisition portion 2521A and a various events generator 2522A.

The first relative relationship output portion 254A realizes the same function as the first relative relationship output portion 154 of the server device 10 described above. However, the first relative relationship output portion 254A outputs a first relative relationship based on the first user avatar M1.

The second relative relationship output portion 256A realizes the same function as the second relative relationship output portion 156 of the server device 10 described above. However, the second relative output portion 256A outputs the second relative relationship based on the first user avatar M1.

The second determination portion 258A realizes the same function as the second determination portion 158 of the server device 10 described above. However, the second determination portion 258A determines whether the second predetermined condition is satisfied with respect to the first user avatar M1.

The RAM 221A realizes the same function as the image data memory 172 of the server device 10 described above. However, the RAM 221A stores the image generation condition related to the event image data acquired by the image data acquisition portion 2521A. In this case as well, on the picture reproduction page, the image output portion 212A may parse the image generation condition acquired by the access as a query parameter and store the image generation condition in a variable, input the image generation condition as an argument to the "Google Maps API" provided by Google Inc. or a similar API method, select avatar information, and the like to realize generation (reproduction) of an image related to the event image data.

Figure 21B:
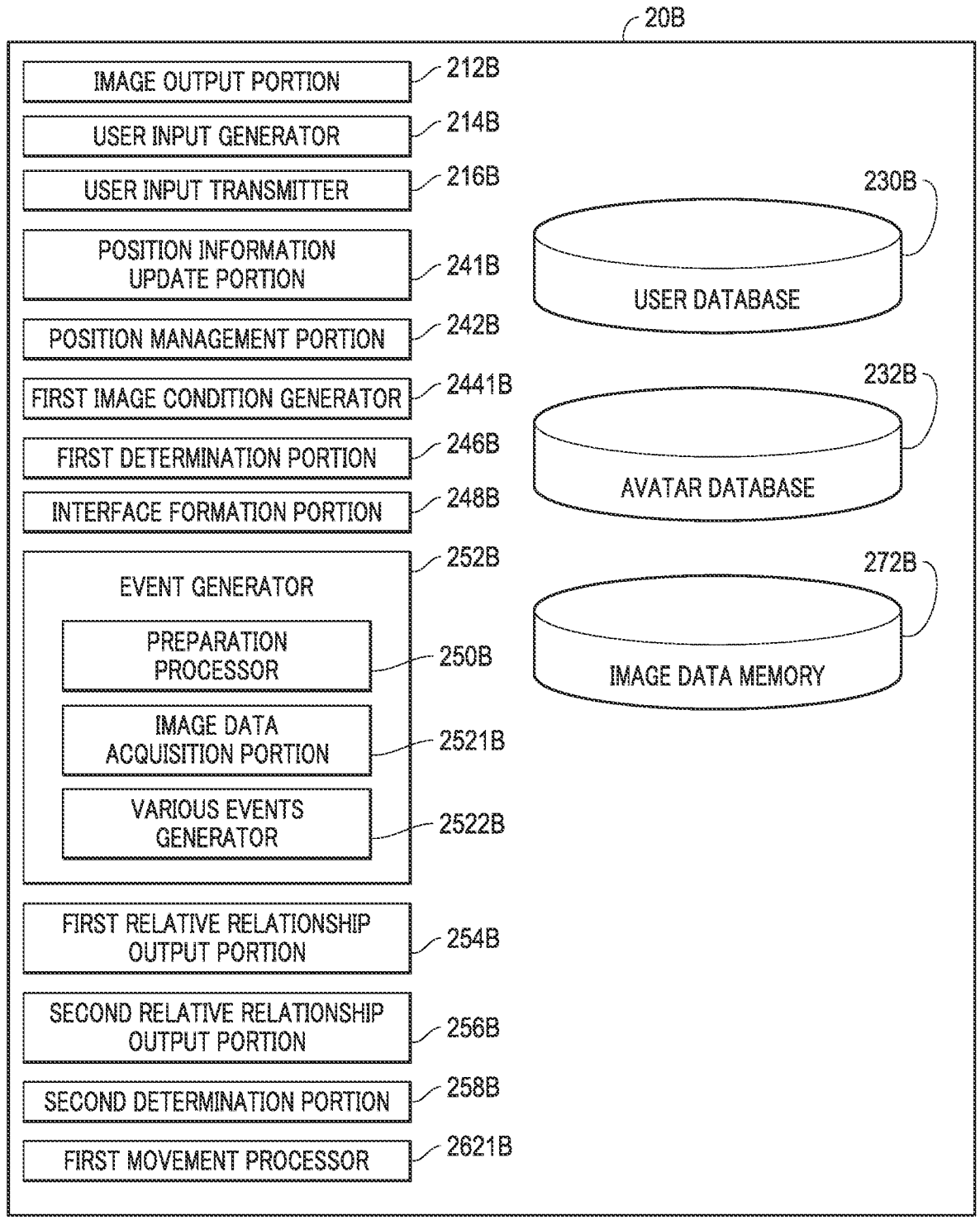
FIG. 21B is a functional block diagram of another example of the terminal device with different sharing modes.

FIG. 21B is a functional block diagram of a terminal device 20B that may be realized instead of the terminal device 20A shown in FIG. 21A. The configuration according to FIG. 21B is preferred when the virtual reality application is in the form of a native application that is different from a Web application that can be used on a browser. The native application is downloaded to the terminal device 20B in advance and used.

In the example shown in FIG. 21B, the terminal device 20B includes an image output portion 212B, a user input generator 214B, and a user input transmitter 216B. The image output portion 212B, the user input generator 214B, and the user input transmitter 216B may be substantially the same as to the image output portion 212, the user input generator 214, and the user input transmitter 216 described above, referring to FIG. 12. Based on the image generation condition for the terminal image generated by the first image condition generator 2441B, which will be described hereafter, the image output portion 212B draws the terminal image and outputs the drawn terminal image on the display portion 23 described above.

Furthermore, in the example shown in FIG. 21B, the terminal device 20B includes a user database 230B, an avatar database 232B, a position information update portion 241B, a position management portion 242B, a first image condition generator 2441B, a first movement processor 2621B, a first determination portion 246B, an interface formation portion 248B, a preparation processor 250B, an event generator 252B, a first relative relationship output portion 254B, a second relative relationship output portion 256B, a second determination portion 258B, and an image data memory 272B.

Hereinafter, the terminal device 20B related to a first user will be described, but the same applies to the terminal device 20B related to a second user(s).

Each portion from the position information update portion 241B to the second determination portion 258B can be realized by the terminal controller (see the terminal controller 25 of FIG. 1) of the terminal device 20B executing the virtual reality application according to this embodiment, which is a program in the terminal memory (see the terminal memory 22 of FIG. 1) of the terminal device 20B. Also, the user database 230B, the avatar database 232B, and the image data memory 272B can be realized by the terminal memory (the terminal memory 22 in FIG. 1) of the terminal device 20B.

The user database 230B may store only data related to each user avatar M1 belonging to the same group as the first user avatar M1, among the data (see FIG. 13) in the user database 130 of the server device 10 described above, and other data may be further stored. Of the data in the user database 230B, the position/orientation information data is updated by the position information update portion 241B based on the position/orientation information transmitted from the server device 10A. Furthermore, other data in the user database 230B may be appropriately updated based on the updated data described above via communication with the server device 10A (for example, when the virtual reality application according to this embodiment is activated and, the like).

The avatar database 232B may store data relating to each user avatar M1 belonging to the same group as the first user avatar M1, among the data (see FIG. 14) in the avatar database 132 of the server device 10 described above, and other data may be further stored. The data in the avatar database 232B may be updated based on the updated data described above via communication with the server device 10A at the time of creating a group, changing the configuration of the user avatars M1 forming the group, and the like.

The position information update portion 241B updates the position/orientation information data in the user database 230B based on the data received from the server device 10A as described above. Further, the position information update portion 241B may update the position/orientation information data related to the first user, among the data in the user database 230B, based on movement operation input and direction operation input from the first user.

The position management portion 242B realizes the same function as the position management portion 142 of the server device 10 described above. However, the arrangement of each user avatar M1 may be performed only for the user avatar(s) M1 in the same group as the first user avatar M1, or may be performed for other user avatars M1.

The first image condition generator 2441B realizes the same function as the first image condition generator 1441 of the server device 10 described above. The first image condition generator 2441B may transmit, to the server device 10A, the generated image generation condition. In this case, the image generation condition can also be stored at the server device 10A side.

The first movement processor 2621B realizes the same function as the first movement processor 1621 of the server device 10 described above.

The first determination portion 246B realizes the same function as the first determination portion 146 of the server device 10 described above. However, the first determination portion 246B determines whether the first predetermined condition is satisfied with respect to the first user avatar M1.

The interface formation portion 248B realizes the same function as the interface formation portion 148 of the server device 10 described above. However, the interface formation portion 148 performs processing related to a terminal image for the first user.

The preparation processor 250B realizes the same function as the preparation processor 150 of the server device 10 described above. However, the preparation processor 250B performs the above-described preparation processing for the first user avatar M1 (that is, based on the determination result of the first determination portion 246B) when the first predetermined condition is satisfied.

The event generator 252B realizes the same function as the event generator 152 of the server device 10 described above. However, the event generator 252B generates an event for first user avatar M1. The event generator 252B includes an image data acquisition portion 2521B and a various events generator 2522B.

The first relative relationship output portion 254B realizes the same function as the first relative relationship output portion 154 of the server device 10 described above. However, the first relative relationship output portion 254B outputs the first relative relationship based on the first user avatar M1.

The second relative relationship output portion 256B realizes the same function as the second relative relationship output portion 156 of the server device 10 described above. However, the second relative relationship output portion 256B outputs the second relative relationship based on the first user avatar M1.

The second determination portion 258B realizes the same function as the second determination portion 158 of the server device 10 described above. However, the second determination portion 258B determines whether the second predetermined condition is satisfied with respect to the first user avatar M1.

The image data memory 272B realizes the same function as the image data memory 172 of the server device 10 described above. However, the image data memory 272B stores the image generation condition related to the event image data acquired by the image data acquisition portion 2521B. In this case as well, on the picture reproduction page, the image output portion 212B parses the image generation condition acquired by the access as a query parameter and stores the image generation condition in a variable, inputs the image generation condition as an argument to the "Google Maps API" provided by Google Inc. or a similar API method, selects avatar information, and the like to realize generation (reproduction) of an image related to the event image data.

Figure 22:
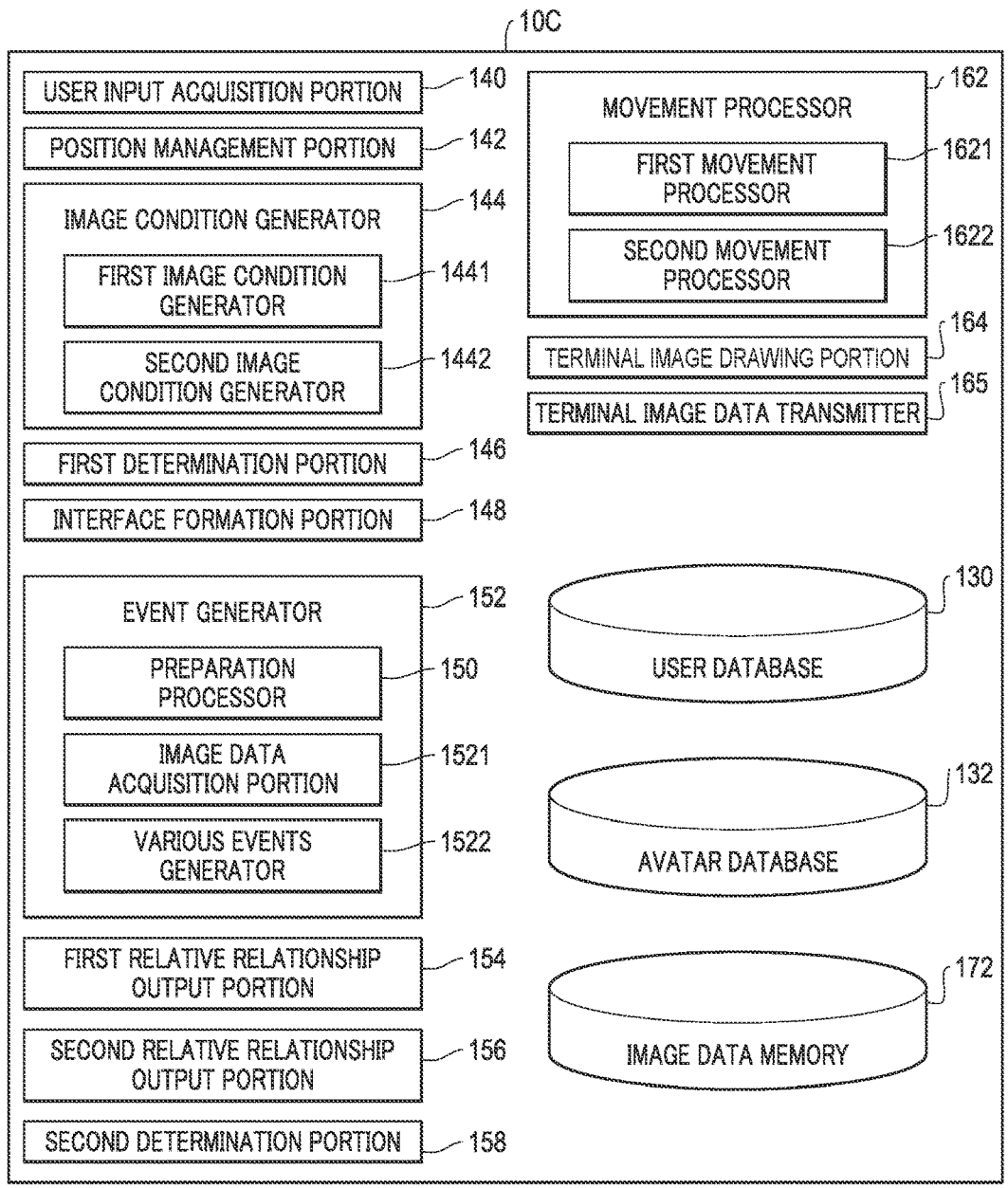
FIG. 22 is a functional block diagram of another example of the server device with different sharing modes.
Figure 22A:
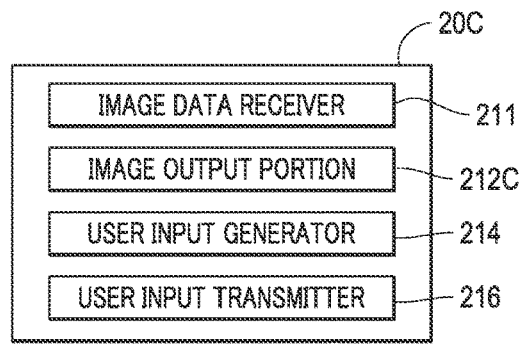
FIG. 22A is a functional block diagram of another example of the terminal device with different sharing modes.

Also, a sharing mode as shown in FIGS. 22 and 22A may be realized. In this case as well, a server device 10C and a terminal device 20C of each user cooperate to realize the same function as the above-described case in which the server device 10 and the terminal device 20 cooperate.

The server device 10C shown in FIG. 22 differs from the server device 10 shown in FIG. 11 in that a terminal image drawing portion 164 and a terminal image data transmitter 165 are added.

The terminal image drawing portion 164 draws a terminal image based on the terminal image generation condition received by the image condition generator 144. For example, the image output portion 212 parses the image generation condition for the terminal image as a query parameter, stores the image generation condition in a variable, inputs the image generation condition as an argument to the method of "Google Map API" provided by Google Inc. or a similar API, selects avatar information, and the like to draw the terminal image.

The terminal image data transmitter 165 transmits, to each of the corresponding terminal devices 20C, image data for a terminal image drawn by the terminal image drawing portion 164.

The terminal device 20C shown in FIG. 22A differs from the terminal device 20 shown in FIG. 12 in that the image generation condition receiver 210 and the image output portion 212 are replaced with an image data receiver 211 and an image output portion 212C, respectively.

The image data receiver 211 receives image data for a terminal image transmitted by the terminal image data transmitter 165.

The image output portion 212C outputs the data of the terminal image received by the image data receiver 211 onto the display portion 23 as described above.

Next, with reference to FIGS. 23 and 24, a partial operation example of the operation of the virtual reality generation system 1 will be described.

Figure 23:
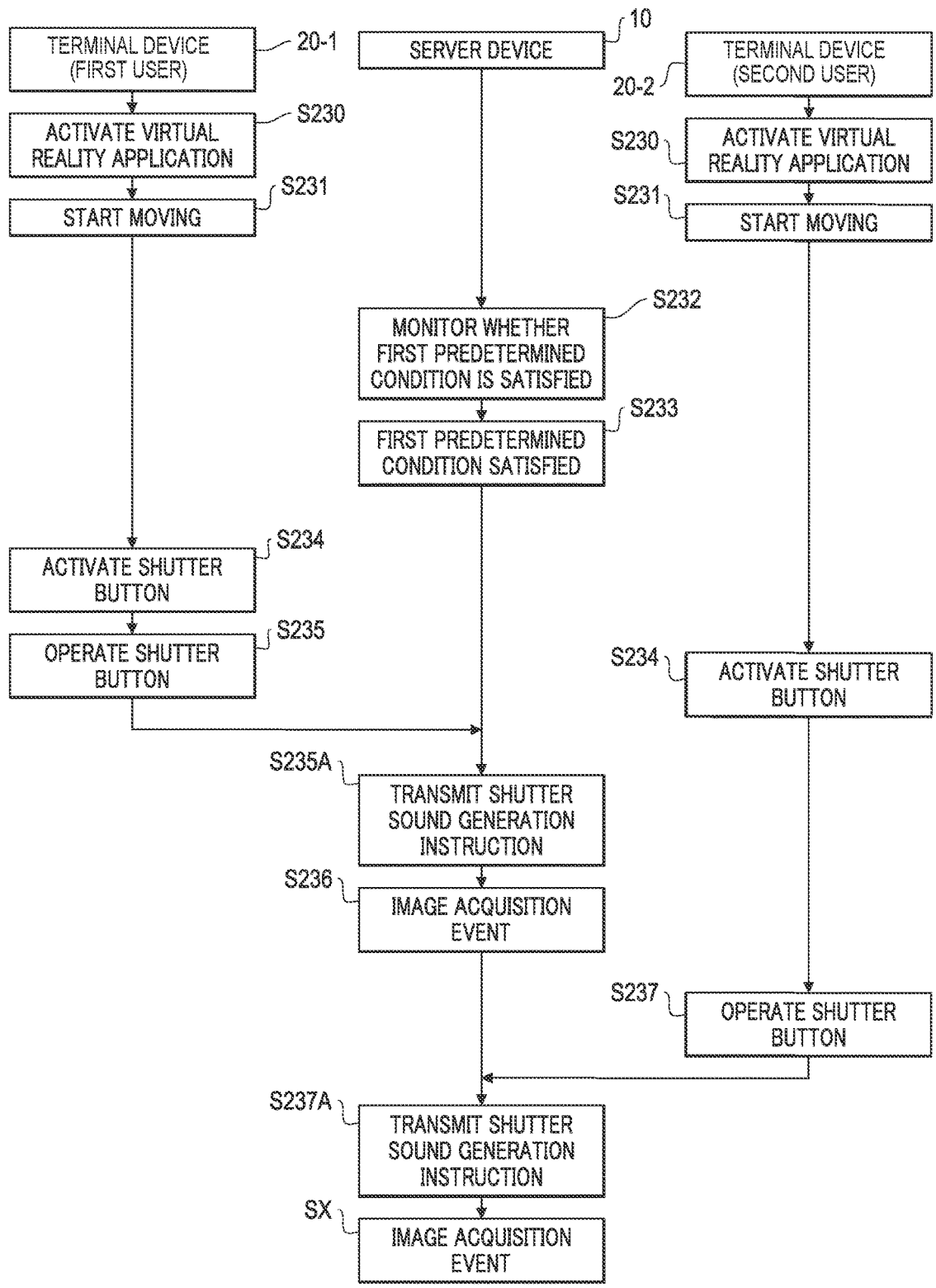
FIG. 23 is a timing chart schematically showing an operation example of the virtual reality generation system regarding occurrence of an image acquisition event.

FIG. 23 is a timing chart schematically showing an operation example of the virtual reality generation system 1 regarding occurrence of an image acquisition event.

In FIG. 23, as two terminal devices 20, a terminal device 20-1 associated with a first user, a terminal device 20-2 associated with a second user, and the server device 10 are shown as subjects of action. Here, for the convenience of explanation, the number of second users is one, but there may be a plurality of second users. In this case, the terminal devices 20 associated with each of the plurality of second users operate in the same manner. This also applies to FIG. 24, which will be described hereafter.

First, the first user and the second user activate the virtual reality application (described as "virtual reality application" in FIG. 23) according to this embodiment (step S230), and perform various initial inputs. The timing at which the virtual reality application is activated may be, for example, the same time period, or may be determined in advance by contact or the like. For example, the first user and the second user may communicate in advance by email or the like, and thereby the time period may be determined after adjusting their schedules. The initial input may include input of a group name, user name, and the like, input for determining each user avatar M1, and the like. In this case, it is assumed that the first user and the second user belong to the same group.

Next, the first and second users may each move within the virtual space via their respective user avatars M1 (step S231). In the virtual space where the user avatars M1 of the first user and the second user move, the server device 10 monitors whether the first predetermined condition is satisfied (step S232). Here, only two user avatars M1, a first user avatar M1 and one second user avatar M1, exist in the target virtual space. In this case, the server device 10 calculates a common first relative positional relationship for the two user avatars M1 and outputs the first relative relationship information while monitoring whether the first predetermined condition is satisfied. However, if there are a first user avatar M1 and a plurality of second user avatars M1, as described above, the server device 10 monitors whether the first predetermined condition is satisfied for each user avatar M1, based on one user avatar M1.

When the first predetermined condition is satisfied, as preparation processing, the operation button B602 (see FIG. 6), which is the shutter button, is activated (placed in an operable state) (steps S233 and S234). Then, when the operation button B602 is operated by the first user (step S235), the server device 10 transmits a shutter sound generation instruction to all the terminal devices 20 related to the user avatars M1 around the first user avatar M1 (step S235A), and generates an image acquisition event for the first user (step S236). Additionally, when the operation button B602 is operated by the second user (step S237), the server device 10 transmits a shutter sound generation instruction to all terminal devices 20 associated with user avatars M1 around the second user avatar M1 (step S237A), and generates an image acquisition event for the second user (step S238). In this case, (i) the image generation condition related to event image data acquired in the image acquisition event (step S236) at the first user side and (ii) the image generation condition related to the event image data acquired in the image acquisition event (step S238) at the second user side may be different from each other due to the difference between the first viewpoint and the second viewpoint. Also, poses and the like may be different from each other. In this case, exchange of event image data and the like is also promoted between the first user and the second user, and it is possible to promote interaction between users. However, in a modified example, (i) the image generation condition related to event image data acquired in the image acquisition event (step S236) at the first user side and (ii) the image generation condition related to event image data acquired in the image acquisition event (step S238) at the second user side may be substantially the same. In this case, the processing load at the server device 10 can be reduced.

Here, regarding steps S235A and S237A, the terminal device(s) 20 that has received the instruction to generate the shutter sound outputs (reproduces) sound information imitating the shutter sound of a camera. In this case, the user(s) of the terminal device(s) 20 can know of an image acquisition event by another user. This makes it possible to activate an image acquisition event at that location.

Figure 24:
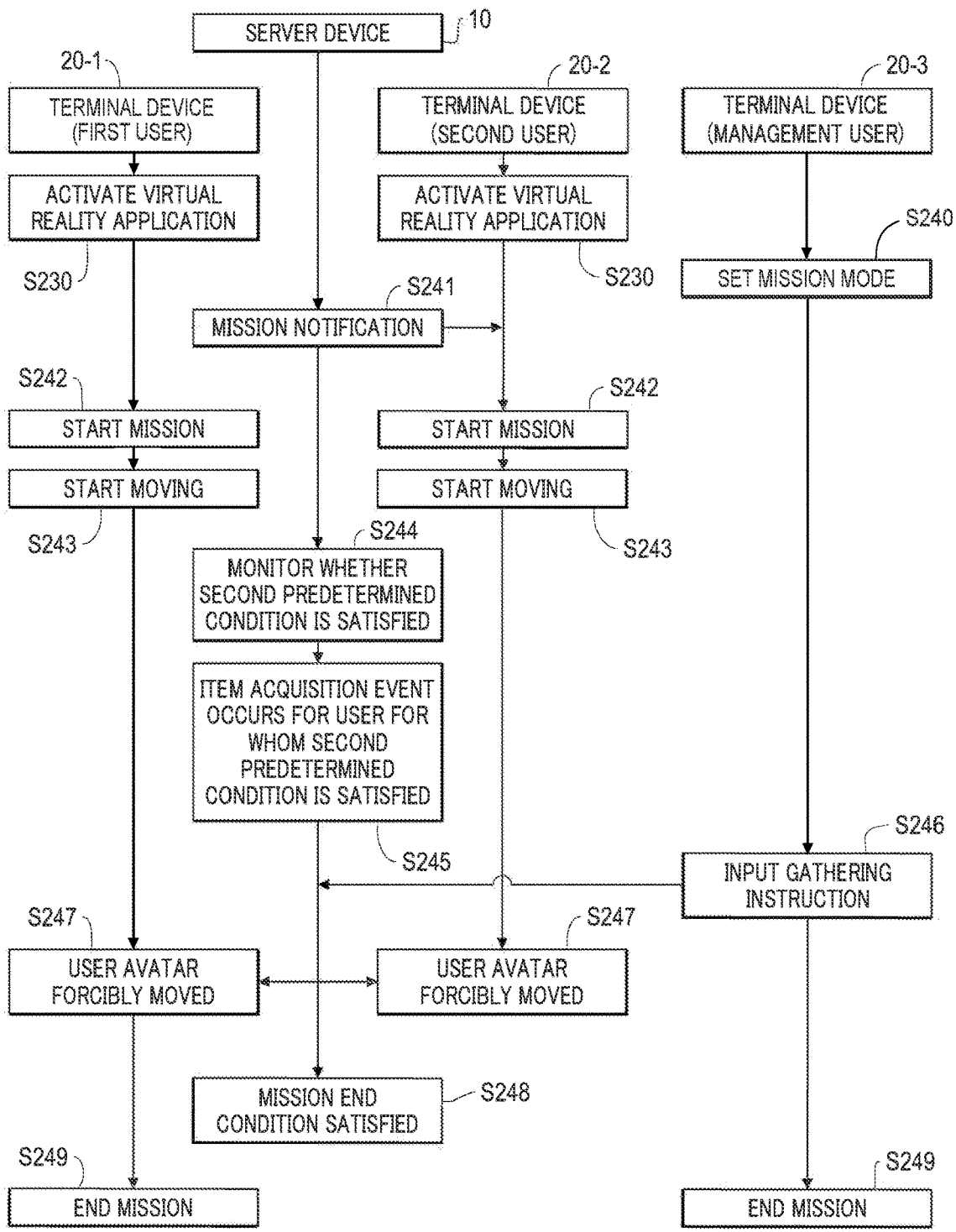
FIG. 24 is a timing chart schematically showing an operation example of the virtual reality generation system regarding occurrence of an item acquisition event.

FIG. 24 is a timing chart schematically showing an operation example of the virtual reality generation system 1 regarding occurrence of an item acquisition event. In FIG. 24, (i) as three terminal devices 20, a terminal device 20-1 associated with a first user, a terminal device 20-2 associated with a second user, and a terminal device 20-3 associated with an administrative user, and (ii) the server device 10 are shown as subjects of action.

First, the first user and the second user activate the virtual reality application (described as "virtual reality application" in FIG. 24) according to this embodiment, and perform various initial inputs. The timing at which the virtual reality application is activated may be, for example, the same time period, or may be determined in advance by contact or the like. For example, when the first user and the second user participate in an event held by an administrative user, the administrative user may provide notification of the time period in advance. The initial inputs may include inputs such as a group name and user names. Further, when the first user and the second user participate in an event held by the administrative user, the initial inputs may include input of information specifying the event and information indicating participation qualifications.

First, the administrative user sets a mission mode via the terminal device 20-3 (step S240). The administrative user may also be able to act in the virtual space via his/her own user avatar M1. The contents of the mission mode may be configured in advance by the administrative user. The server device 10 notifies each user of the mission corresponding to the started mission mode (step S241), and the mission is started (step S242). The mission may be, for example, a search-type mission such as searching for and acquiring a specific item (acquisition target item) such as the flamingo egg as described above, or a learning-type mission in which a virtual reality medium corresponding to a specific item (for example, completion information) is obtained by viewing specific content and submitting an assignment. Here, it is assumed that the mission is a search-type mission in which a specific item is searched for and acquired.

Next, the first and second users may move within the virtual space via their respective user avatars M1 (step S243). In the virtual space where the user avatars M1 of the first user and the second user move, the server device 10 places a specific item and monitors whether the second predetermined condition is satisfied (step S244). In this case, the server device 10 calculates a second relative positional relationship with respect to a common specific item for each user avatar M1, outputs the second relative relationship information, and monitors whether the second predetermined condition is satisfied.

When the second predetermined condition is satisfied, the server device 10 generates an item acquisition event for the user avatar(s) M1 that satisfies the second predetermined condition (step S245). After that, the administrative user generates a gathering instruction input via the terminal device 20-3 as appropriate (step S246). In this case, for example, each user avatar M1 is forcibly moved to a corresponding predetermined gathering place according to the gathering instruction input (step S247). As described above, instead of forcibly moving, based on a response input (approval input) from each user, each user avatar M1 may be forcibly moved to a corresponding predetermined gathering place. Then, when a mission completion condition is satisfied (step S248), the server device 10 terminates the mission (step S249). The mission completion condition is arbitrary, and may be set based on, for example, elapsed time.

Next, with reference to FIG. 25 and after, a modified example with respect to the above-described embodiment will be described.

Figure 25:
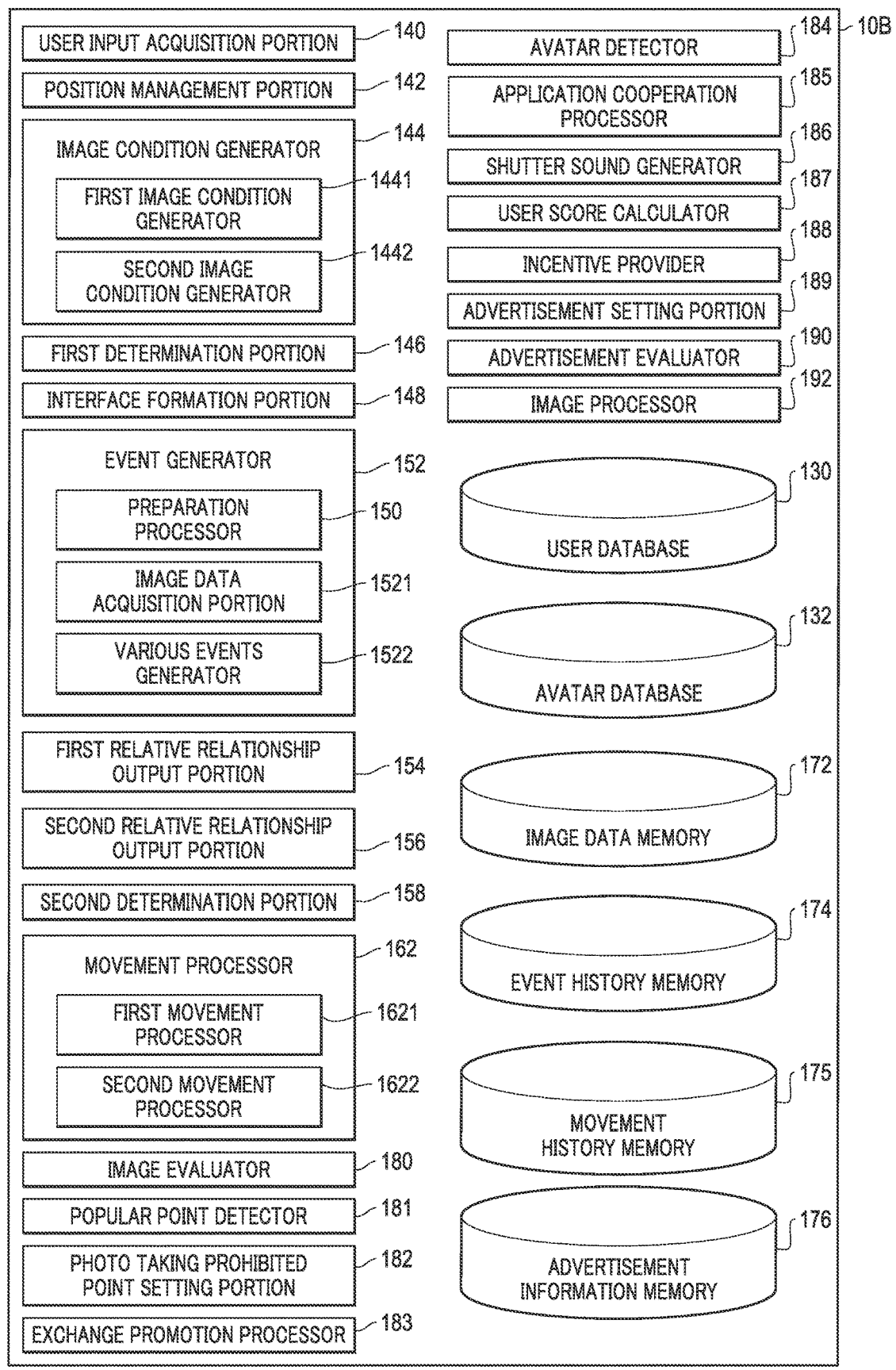
FIG. 25 is a functional block diagram of a server device according to a modified example.
Figures 26, 27:
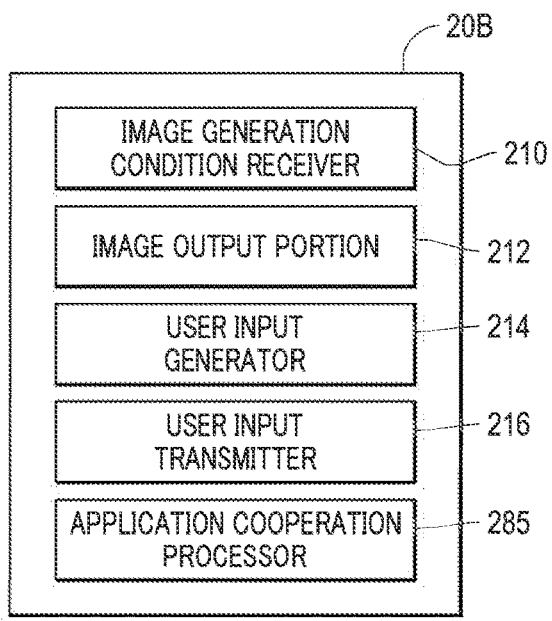
FIG. 26 is an explanatory diagram of data in an advertisement information memory.
FIG. 27 is a functional block diagram of a terminal device according to a modified example.

FIG. 25 is a functional block diagram of a server device 10B according to a modified example. FIG. 26 is an explanatory diagram of data in an advertisement information memory 176.

With respect to the server device 10 described above with reference to FIG. 11, the server device 10B according to this modified example has an event history memory 174, a movement history memory 175, an advertisement information memory 176, an image evaluator 180, a popular point detector 181, a picture taking prohibited point setting portion 182, an exchange promotion processor 183, an avatar detector 184, an application cooperation processor 185, a shutter sound generator 186, a user score calculator 187, an incentive provider 188, an advertisement setting portion 189, an advertisement evaluator 190, and an image processor 192.

In a further modified example with respect to this modified example, a part of the various functions of the server device 10 described above with reference to FIG. 11 may be omitted, and a part of the devices from the image processor 192 to the event history memory 174 may be omitted.

The event history memory 174 stores the history of various events occurring at each coordinate in the virtual space. Although the precision of each coordinate for event history recording is arbitrary, it may be, for example, a facility unit. Alternatively, the precision of coordinates for event history recording may be set according to location attributes. Various events for which the history is to be stored may be the above-described image acquisition events or the like. History data of various events in the event history memory 174 may be output (displayed) for a specific user as appropriate. The history data of various events in the event history memory 174 may be used as big data or collective intelligence.

The movement history memory 175 stores movement history data (history data related to movements in the virtual space) of each user avatar M1. The movement history data of each user avatar M1 may include information such as the locus of coordinates related to movement, date and time, stop time (stay time), and the like. Also, the history data of orientation information of each user avatar M1 may also be stored in association with the movement history data of each user avatar M1. In this case, it is possible to obtain information such as what line-of-sight direction each user avatar M1 had at each coordinate.

The advertisement information memory 176 stores various types of information (hereinafter referred to as "advertisement information") regarding advertisements placed as virtual reality media in the virtual space. In the example shown in FIG. 26, each advertisement ID is associated with various related information such as information specifying an advertiser (advertiser ID), advertisement content, advertisement position information, advertisement period, result information, and the like.

The advertisement content may be in the form of images or videos, the form of advertising avatars active in the virtual space, or the form of AR items such as AR (Augmented Reality) signboards. Additionally, advertisements may also be realized in the form of events in virtual space. In any case, the advertisement content may be set based on information provided by the advertiser. Position information of advertisement may be set in a coordinate system associated with a real space image. If the advertisement content is in the form of an advertising avatar, the position information of the advertising avatar may be dynamically updated. The advertising period is a period determined in advance according to a contract, or the like. The result information is information representing the result of the advertisement. Result information may include index values (for example, CPI: Cost Per Install, CPA: Cost Per Acquisition, CTR: Click Through Rate) and similar (for example, CPA: Cost Per Action, CPC: Cost Per Click, CPM: Cost Per Mille) that are widely known in the field of advertising.

The image evaluator 180 evaluates/analyzes image data acquired by each user, or an image generation condition of the image data (for example, image generation condition related to event image data acquired by the above-described image acquisition event). In this case, the image evaluator 180 may quantify the number of times an image is captured for each coordinate, the number of user avatars M1 included in the image for each coordinate, and the like.

Furthermore, the image evaluator 180 may detect a rare event when a rare object or user avatar M1 (for example, celebrity user avatar M1) is captured in image data of the same location. Additionally, the image evaluator 180, for the place where an image was taken for the first time, may generate information specifying the user who captured the image (hereinafter also referred to as "first image capturing user")

Additionally, the image evaluator 180 may generate various types of information in a manner in which the user's shooting action (operation of the operation button B602 (see FIG. 6), which is a shutter button) is replaced with a "vending machine" in the virtual space. For example, regarding an avatar item apparel store, it may be possible to record how the user avatar/user took a picture or purchased an item that looks attractive in which store. In this case, such information may be shared among users by the exchange promotion processor 183, which will be described hereafter.

The popular point detector 181 detects popular points (for example, attractive points) in the virtual space. A popular point is, for example, a place visited by each user avatar M1 many times and may be detected based on movement history data of each user avatar M1. Also, popular points may be detected based on history data of various events in the event history memory 174. In this case, the higher the number of occurrences of image acquisition events, the more popular the place.

Also, the popular point detector 181 may detect a popular line-of-sight direction at the popular point by evaluating the line-of-sight direction of each user avatar M1. The line-of-sight direction of each user avatar M1 may be evaluated based on the history data of the orientation information described above. In this case, an object or place to which the line of sight of each user avatar M1 is directed more often may be evaluated as a more popular object or place.

Thus, the popular points detected by the popular point detector 181 can be used in various ways. For example, popular points may be ranked according to popularity, and the rank of each popular point may be communicated to users in various manners. For example, for the rank of each popular point, a predetermined number of higher ranks may be displayed as popularity ranking information. Also, popular spots that are rising in popularity may be selected. A popular point with a high rank may be presented to each user as recommended information. In this case, for example, one of the above-described instantaneous movement buttons B605 to B609 may be the destination of the presented popular point (place), and instantaneous movement to the popular spot may be enabled. Additionally, popular spots presented to each user as recommended information may be extracted for each user based on each user's attributes, preferences, and the like. For example, the popular spots presented to one user may include popular spots frequently visited by other users who behave similarly to the one user.

The picture taking prohibited point setting portion 182 sets a prohibition point for an image acquisition event and/or a prohibition point for normal picture taking. At the prohibition point of the image acquisition event or the like, the operation button B602 (See FIG. 6), which is the shutter button, may be deactivated or not displayed. The picture taking prohibited point setting portion 182 may automatically set the picture taking prohibited point from the viewpoint of, for example, confidentiality, privacy, or the like, or may set the prohibition point according to the input from the administrative user.

If a predetermined transmission condition is satisfied, the exchange promotion processor 183 transmits an image (event image data in FIG. 20 or image generation condition thereof, or the like) acquired by the user of one user avatar M1 through the operation of the operation button B602 (see FIG. 6) to another user (for example, a user of friend information). The predetermined transmission condition is arbitrary and may be appropriately set by each user. In this case, the exchange promotion processor 183 may generate a two-dimensional code such as a QR code (registered trademark) so that other users can access the corresponding image or the acquisition position (location) of the image. Furthermore, in this case, the exchange promotion processor 183 may form a user interface through the interface formation portion 148 so that the user avatar M1 of another user can instantaneously move to the location where the image has been acquired. In this case, it is possible to effectively promote various exchanges between users, such as introducing an attractive picture shooting point to a friend's user, or taking a picture with the friend's user avatar M1.

When detecting the movement of one user avatar M1 to a specific detection target location, the avatar detector 184 generates a notification (hereinafter also referred to as "detection notification") that one user avatar M1 has been detected at a specific detection target location. The avatar detector 184 may generate a detection notification when, for example, one user avatar M1 enters the angle of view of a virtual camera installed at a specific detection target location. The detection notification may include information (user avatar ID) specifying the detected user avatar M1. Furthermore, the avatar detector 184 may include, in the detection notification, image data of the detected user avatar M1 captured by the virtual camera. The destination (notification destination) of the detection notification may be set for each specific detection target location. A specific detection target location may be able to be set by an administrative user or a specific user. For example, an administrative user may set a restricted area or the like as a specific detection target location. In this case, the destination (notification destination) of the detection notification may include the administrative user who set the specific detection target location.

Additionally, when the line of sight of one user avatar M1 is directed to a specific detection target object, the avatar detector 184 generates a notification to that effect (hereinafter also referred to as a "notification of detection of the line of sight to a specific detection target object"). Whether the line of sight of one user avatar M1 is directed to a specific detection target object may be determined in real time based on orientation information of each user avatar M1 and position information of the specific detection target object, or may be determined offline based on the history data of the orientation information described above. The transmission destination (notification destination) of the notification of detection of the line of sight to the specific detection target object may be set in the same manner as the specific detection target location described above.

When the operation button B602 (see FIG. 6), which is the shutter button, is operated by one user at one location in the virtual space, the shutter sound generator 186 outputs information (referred to as "imaging event occurrence information") notifying a user (another user different from the one user) associated with another user avatar M1 positioned at the one location that the shutter button has been operated. The imaging event occurrence information may be output via, for example, sound information such as a shutter sound. For example, a shutter sound generation instruction (see steps S235A, 237A of FIG. 23) may be transmitted to the terminal device 20 pertaining to the other user, and the shutter sound may be output (reproduced). In this case, other users can be informed experientially and indirectly that "this location is a place worth taking a picture of." In this configuration, it is more likely that more shutter sounds will be heard at popular points. This allows each user to aurally identify each popular point in the virtual space.

The user score calculator 187 calculates various scores associated with each user (or each user avatar M1). The various scores may include a score that serves as an indicator of the degree of activity in the virtual space. Additionally, the user score calculator 187 may give a special score (bonus score) to a user who caused the rare event described above and/or the first image capturing user described above, based on the evaluation result by the image evaluator 180 described above. Alternatively, in an event such as a picture taking gathering, a score may be given to each participating user based on the picture (image acquired via the operation button B602) acquired by each participating user. In this case, the arrangement (composition) of objects in the picture may be the subject of evaluation.

The incentive provider 188 gives an incentive to each user avatar M1 (or each user) active in the virtual space when the incentive provision condition is satisfied. The incentive provision condition may be determined for each user avatar M1 (or each user). Additionally, the incentive provision condition may be provided for each incentive or for each incentive attribute. For example, the incentive could be naming rights for famous points. In this case, the naming right may be given to the user avatar M1 who first reached the famous point or the user who took the first picture at the famous point (the user who operated the operation button B602). In this case, the incentive may be given each time a new famous point is generated.

Furthermore, similar to or instead of the user score calculator 187, the incentive provider 188 may give a specific incentive (for example, proof information that it is a point where the first picture was taken) to the user who caused the rare event described above and/or the first image capturing user described above. Additionally, the incentive provider 188 may give a specific incentive to a user whose score given by the user score calculator 187 exceeds a threshold value.

The advertisement setting portion 189 sets advertisements in the virtual space. When setting an advertisement, the advertisement setting portion 189 may assign a new advertisement ID and update the data in the advertisement information memory 176 (see FIG. 26).

Advertisement content related to the advertisement thus set by the advertisement setting portion 189 is presented to a user (user avatar M1) for whom a predetermined presentation condition is satisfied during the period of the advertisement. Presentation of advertisement content may be realized by generating an image generation condition by the image condition generator 144 in a state of being included in the terminal image for each user described above. In this case, the image condition generator 144 may superimpose an image or video of the advertisement content on the real space image. For example, based on the relationship between the position/orientation information of the first user avatar M1 and the position information of one advertisement, the first image condition generator 1441 determines whether the position information of the one advertisement is positioned within the field of view of the first user avatar M1. Then, when the position information of the one advertisement is positioned within the field of view of the first user avatar M1, the first image condition generator 1441 may generate, on the terminal image related to the first user, an image generation condition for drawing the corresponding advertisement content.

The predetermined presentation condition is arbitrary, but a target layer may be set for each advertisement ID. In this case, one advertisement content may be presented only to users (user avatars M1) who match the target layer associated with the one advertisement content. Also, when the advertisement content is an AR item, the predetermined presentation condition may be presented only to user avatars M1 who have a tool for making the AR item visible (for example, a smartphone as a virtual reality medium).

The advertisement setting portion 189 may set the cost required for the advertisement (the cost borne by the advertiser) according to the position information of the advertisement. In this case, the advertisement setting portion 189 may set the cost according to the position information of the advertisement in a manner in which the cost of popular points detected by the popular point detector 181 increases. For example, because many people will want to shoot in front of the Hachiko statue in Shibuya, Tokyo, the cost of setting up an advertisement in such a location is relatively high.

The advertisement evaluator 190 generates the result information described above for each advertisement ID. For example, the advertisement evaluator 190 may use the number of times a user avatar M1's line of sight is directed to the corresponding advertisement content (that is, the number of users related to the terminal image on which the advertisement content is drawn), the integrated value of the time that the avatar M1's line of sight is directed to the advertisement content, the number of times the advertisement content is reflected in the image data of an image acquisition event or the like, and the like, as an evaluation material for one advertisement ID. Also, the advertisement evaluator 190 may measure the advertisement effect by setting a signboard in the real space and a signboard in the virtual space. This is also true for non-signboard advertisements.

The result information thus generated by the advertisement evaluator 190 may be used to calculate the advertisement cost in the real space, or may be used to calculate a land price. (real estate transactions, and the like). This is also true for the detection results by the popular point detector 181 described above. Also, the result information generated by the advertisement evaluator 190 may be used for setting real advertisements in real space. For example, if the result shown in the result information at one location related to one advertisement ID is relatively high, the corresponding advertisement may be displayed on digital signage or the like in the real space. Thus, the advertisement in the virtual space may be set primarily, and the advertisement in the real space may be set secondarily, and the advertisement in the real space may be set in conjunction with the advertisement in the virtual space according to the result information of the advertisement in the virtual space.

Also, the result information thus generated by the advertisement evaluator 190 may be reflected in the price of each area (including a spatial portion(s)) in the corresponding virtual space. This is suitable for various transactions (sale, lease, and the like) of land (territory) in virtual space.

In response to a request from a corresponding user, the image processor 192 performs various types of processing of image generation conditions pertaining to image data in the image data memory 172 that is associated with the corresponding user. The various types of processing are arbitrary, but may include, for example, embedding a two-dimensional code such as the QR code (registered trademark) for exchange described above. Additionally, the various types of processing may include a process of linking information based on real space to an image or a URL, such as "Picture taken at Roppongi Hills at N time on the N month and N day." Further, the various types of processing may include a process of embedding rights information such as a copyright. Additionally, part or all of the various types of processing may be automatically realized independently of requests from corresponding users. Also, some or all of the contents of various types of processing may be set (customized) in advance by the user.

The various types of processing may include the automatic generation of preview pictures for real estate transactions. In this case, the process of automatically generating preview pictures may include a process of removing only other user avatars from pictures and/or videos of locations that everyone wants to live in or buy that the user avatar M1 has visited.

Incidentally, one of the functions desired of real estate pictures pertaining to an old real space is to give the impression of so-called beauty or the impression that the property is wider and cleaner than it actually is, so that "customers such as renters/buyers will be interested and inquire with the real estate agent." Specifically, the images may be posted in such a way that they appear wider than the actual human field of view by using a wide-angle lens. Additionally, the view from the window and the orientation of the camera may also be taken and generated arbitrarily by a photographer.

In contrast, in the case of a real estate picture using the automatic generation processing of the image processor 192 according to this modified example, unlike an image taken by a simple 360-degree camera, the size of an actual person is compared (narrow/wide, ceiling is high/low, and the like), allowing simulation of a plurality of users in the same space. That is, since the user avatar M1 can reflect the size of an actual human being, the sense of spaciousness is more realistic. Additionally, it is possible to store the viewpoints of other users (points of interest, high/low evaluation) and the like. This is in contrast to a typical 360-degree image, which does not store the angle of view or direction of attention of others. Furthermore, the real estate agent can also record as data that "other users were interested in this type of thing." Thus, the image(s) pertaining to the image generation condition in the image data memory 172 can be used as shots with high marketability in terms of name, and here, by removing the user avatar M1 and displaying the picture, a picture or video suitable for real estate transactions can be acquired. The terminal image is based on the real space image as described above, and by composing it on, for example, JavaScript (registered trademark) as described above, it is possible to dynamically control the display/non-display of the user avatar.

FIG. 27 is a functional block diagram of a terminal device 20B according to a modified example. Compared to the terminal device 20 described above with reference to FIG. 12, the terminal device 20B according to this modified example differs in that an application link processor 285 is added.

The application link processor 285 links the virtual reality application according to this embodiment with other GPS-using applications and notifications in the terminal device 20B. A GPS-using application refers to an application that uses the position information of a GPS function built into the terminal device 20B, and its type is arbitrary. For example, when the terminal device 20B associated with the first user is provided with a GPS-using application that generates a specific notification at a specific location in real space, when the first user avatar M1 is positioned at a corresponding specific location in the virtual space, a specific notification may occur via the GPS-using application.

Additionally, based on the movement history of the first user (history of position information of the GPS function built in the terminal device 20B) in the real space, the application link processor 285 may link the position information of the first user avatar M1 in the virtual space. For example, the position information of the first user avatar M1 in the virtual space may be changed based on the movement history of the first user in the real space from M to L time on the M month and M day. In this case, the first user can look back on the experience in the real space from M to L time on the past M month and M day in the virtual space via the first user avatar M1.

Also for the server device 10B and the terminal device 20B according to this modified example, as described above with reference to FIGS. 21 and 21A for the server device 10 and the terminal device 20 described above, task assignment of functions between the server device 10B and the terminal device 20B described above can be changed in various ways. For example, part of devices ranging from the event history memory 174 to the image processor 192 may be realized by the terminal device 20B.

The above embodiments have been described in detail with reference to the drawings, but specific configurations are not limited to the various embodiments described above, and designs and the like that do not depart from the substance of this disclosure are also included.

For example, in the above-described embodiments, an image acquired by the event generation described above (for example, a picture or video acquired by taking a commemorative picture) may be distributed as an NFT.

Explanation of Symbols 1 virtual reality generation system
3 network
10, 10A, 10B server devices
11 server communicator
12 server memory
13 server controller
20, 20A, 20B terminal devices
21 terminal communicator
22 terminal memory
23 display portion
23A head-mounted display
24 input portion
25 terminal controller
60 virtual camera
130 user database
132 avatar database
140 user input acquisition portion
142 position management portion
144 image condition generator
1441 first image condition generator
1442 second image condition generator
146 first determination portion
148 interface formation portion
150 preparation processor
152 event generator
1521 image data acquisition portion
1522 various events generator
154 first relative relationship output portion
156 second relative relationship output portion
158 second determination portion
162 movement processor
1621 first movement processor
1622 second movement processor
172 image data memory
210 image generation condition receiver
212 image output portion
214 user input generator
216 user input transmitter

The invention claimed is:

1. An information processing system comprising:
one or more processors programmed to
position in a virtual space (i) a first avatar corresponding to a first user and (ii) a second avatar corresponding to a second user,
acquire inputs from each of the first and second users,
generate a first display image, the first display image including an image of the virtual space viewed from a first viewpoint corresponding to the first avatar,
generate a second display image, the second display image including an image of the virtual space viewed from a second viewpoint corresponding to the second avatar,
determine whether at least one of (i) respective positions of the first avatar and the second avatar in the virtual space, and (ii) a first relative positional relationship between the first avatar and the second avatar in the virtual space, satisfies a predetermined condition, and
cause an image acquisition event to occur when the predetermined condition is determined to be satisfied, wherein the one or more processors select at least one pose from among a plurality of types of poses, and draw the first avatar and the second avatar with the selected at least one pose, wherein
a first pose of the first avatar is selected according to a first user operation and a second pose of the second avatar is selected according to a second user operation, and
the image acquisition event acquires an image showing the first avatar and the second avatar.

2. The information processing system according to claim 1, wherein
the predetermined condition is that a distance between the first avatar and the second avatar in the virtual space is within a predetermined distance.

3. The information processing system according to claim 1, wherein
the image acquisition event is set or selected by the first user.

4. The information processing system according to claim 1, wherein
a third avatar is included in the image acquisition event together with the first avatar and the second avatar.

5. The information processing system according to claim 1, wherein
the one or more processors are further programmed to, based on the first relative positional relationship, cause first relationship information to be displayed respectively on the first and second display images, the first relationship information showing or suggesting the first relative positional relationship.

6. The information processing system according to claim 5, wherein
the first relationship information includes at least one of (i) a compass image showing a direction as the first relative positional relationship and (ii) a numerical image showing a distance as the first relative positional relationship.

7. The information processing system according to claim 6, wherein the one or more processors are further programmed to
calculate the direction displayed on the first display image based on the first viewpoint of the first avatar in the virtual space and the respective positions of the first avatar and the second avatar in the virtual space, and
calculate the direction displayed on the second display image based on the second viewpoint of the second avatar in the virtual space and the respective positions of the first avatar and the second avatar in the virtual space.

8. An information processing method comprising:
positioning in a virtual space (i) a first avatar corresponding to a first user and (ii) a second avatar corresponding to a second user;
acquiring inputs from each of the first and second users;
generating a first display image, the first display image including an image of the virtual space viewed from a first viewpoint corresponding to the first avatar;
generating a second display image, the second display image including an image of the virtual space viewed from a second viewpoint corresponding to the second avatar;

determining whether at least one of (i) respective positions of the first avatar and the second avatar in the virtual space, and (ii) a first relative positional relationship between the first avatar and the second avatar in the virtual space, satisfies a predetermined condition; and causing an image acquisition event to occur when the predetermined condition is determined to be satisfied, the image acquisition event including selecting at least one pose from among a plurality of types of poses and drawing the first avatar and the second avatar with the selected at least one pose, wherein a first pose of the first avatar is selected according to a first user operation and a second pose of the second avatar is selected according to a second user operation, and the image acquisition event acquires an image showing the first avatar and the second avatar.

9. The information processing method according to claim 8, wherein the predetermined condition is that a distance between the first avatar and the second avatar in the virtual space is within a predetermined distance.

10. The information processing method according to claim 8, wherein the image acquisition event is set or selected by the first user.

11. The information processing method according to claim 8, wherein a third avatar is included in the image acquisition event together with the first avatar and the second avatar.

12. The information processing method according to claim 8, further comprising based on the first relative positional relationship, causing first relationship information to be displayed respectively on the first and second display images, the first relationship information showing or suggesting the first relative positional relationship.

13. The information processing method according to claim 12, wherein the first relationship information includes at least one of (i) a compass image showing a direction as the first relative positional relationship and (ii) a numerical image showing a distance as the first relative positional relationship.

14. The information processing method according to claim 13, further comprising calculating the direction displayed on the first display image based on the first viewpoint of the first avatar in the virtual space and the respective positions of the first avatar and the second avatar in the virtual space; and calculating the direction displayed on the second display image based on the second viewpoint of the second avatar in the virtual space and the respective positions of the first avatar and the second avatar in the virtual space.

15. A non-transitory computer-readable medium storing a program causing a computer to execute:

positioning in a virtual space (i) a first avatar corresponding to a first user and (ii) a second avatar corresponding to a second user;

acquiring inputs from each of the first and second users;

generating a first display image, the first display image including an image of the virtual space viewed from a first viewpoint corresponding to the first avatar;

generating a second display image, the second display image including an image of the virtual space viewed from a second viewpoint corresponding to the second avatar;

determining whether at least one of (i) respective positions of the first avatar and the second avatar in the virtual space, and (ii) a first relative positional relationship between the first avatar and the second avatar in the virtual space, satisfies a predetermined condition; and causing an image acquisition event to occur when the predetermined condition is determined to be satisfied, the image acquisition event including selecting at least one pose from among a plurality of types of poses and drawing the first avatar and the second avatar with the selected at least one pose, wherein a first pose of the first avatar is selected according to a first user operation and a second pose of the second avatar is selected according to a second user operation, and the image acquisition event acquires an image showing the first avatar and the second avatar.

* * * * *